(12) United States Patent
Pole et al.

(10) Patent No.: US 12,743,328 B2
(45) Date of Patent: Sep. 22, 2026

(54) METHOD AND SYSTEM FOR REAL-TIME IDENTIFICATION OF BLAST RADIUS OF A FAULT IN A GLOBALLY DISTRIBUTED VIRTUAL DESKTOP FABRIC

(71) Applicant: Workspot, Inc., Campbell, CA (US)

(72) Inventors: Anushree Kunal Pole, Campbell, CA (US); Amitabh Bhuvangyan Sinha, Campbell, CA (US); Jimmy Chang, Campbell, CA (US); David T. Sulcer, Campbell, CA (US)

(73) Assignee: WORKSPOT, INC., Campbell, CA (US)

( * ) Notice: Subject to any disclaimer, the term of this patent is extended or adjusted under 35 U.S.C. 154(b) by 0 days.

(21) Appl. No.: 18/766,373

(22) Filed: Jul. 8, 2024

(65) Prior Publication Data

US 2024/0362098 A1 Oct. 31, 2024

Related U.S. Application Data

(63) Continuation of application No. 17/853,313, filed on Jun. 29, 2022, now Pat. No. 12,032,431.

(51) Int. Cl.
*G06F 11/00* (2006.01)
*G06F 9/451* (2018.01)
*G06F 11/07* (2006.01)

(52) U.S. Cl.
CPC .......... *G06F 11/0712* (2013.01); *G06F 9/452* (2018.02); *G06F 11/0784* (2013.01); *G06F 11/079* (2013.01)

(58) Field of Classification Search
CPC ............. G06F 11/0712; G06F 11/0784; G06F 11/079; G06F 11/076; G06F 11/0754; G06F 9/452
See application file for complete search history.

(56) References Cited

U.S. PATENT DOCUMENTS 8,588,395 B2 11/2013 Hendricks et al.
12,032,431 B2 * 7/2024 Pole .................... G06F 11/0712
2002/0022952 A1 2/2002 Zager et al.
2019/0149396 A1 5/2019 Zafer et al.
2021/0406106 A1 12/2021 Moss et al.
2022/0334903 A1 10/2022 Pole et al.
2023/0048378 A1 2/2023 Yashchin et al.
2023/0138271 A1 5/2023 Crespo et al.

* cited by examiner

*Primary Examiner* — Marc Duncan
(74) *Attorney, Agent, or Firm* — NIXON PEABODY LLP

(57) ABSTRACT

A system and method for determining a blast radius of a major incident occurring in a virtual desktop system is disclosed. The virtual desktop system has interconnected service components and provides access to virtual desktops by client devices. An event collection module collects events from the service components. An aggregation module merges the collected events in a time-ordered stream, provides context to the events in the time-ordered stream through relationships between the collected events, and generates a correlated event stream. An analysis module determines a stream of problem reports from the correlated event stream. The analysis module determines a spike in the stream of problem reports and determines the attributes of the problem reports in the spike to define the major incident. The analysis module determines a scope of the major incident and a corresponding attribute, to determine a blast radius associated with the major incident in the desktop system.

20 Claims, 10 Drawing Sheets

600

| Timestamp | Today 9am |
|---|---|
| Error-text | Could not connect |
| Error-code | 5432 |
| User | dave@acme.com |
| Company-id | 4319 |
| Desktop-id | Dt123 |
| CPU | 23 |
| Gateway | Mygw01.acme.com |
| | |

610

| Timestamp | Today 9am |
|---|---|
| CPU | 98 |
| Region | USW |
| User | dave@acme.com |
| Company-id | 4319 |
| Desktop-id | Dt123 |
| Gateway | Mygw01.acme.com |
| Alarm | Critical-CPU |

620

| Timestamp | Today 9am |
|---|---|
| Target Type | Gateway Component |
| Target Id | Mygw01.acme.com |
| Change Type | Agent-Version |
| New Value | 3.4.5 |

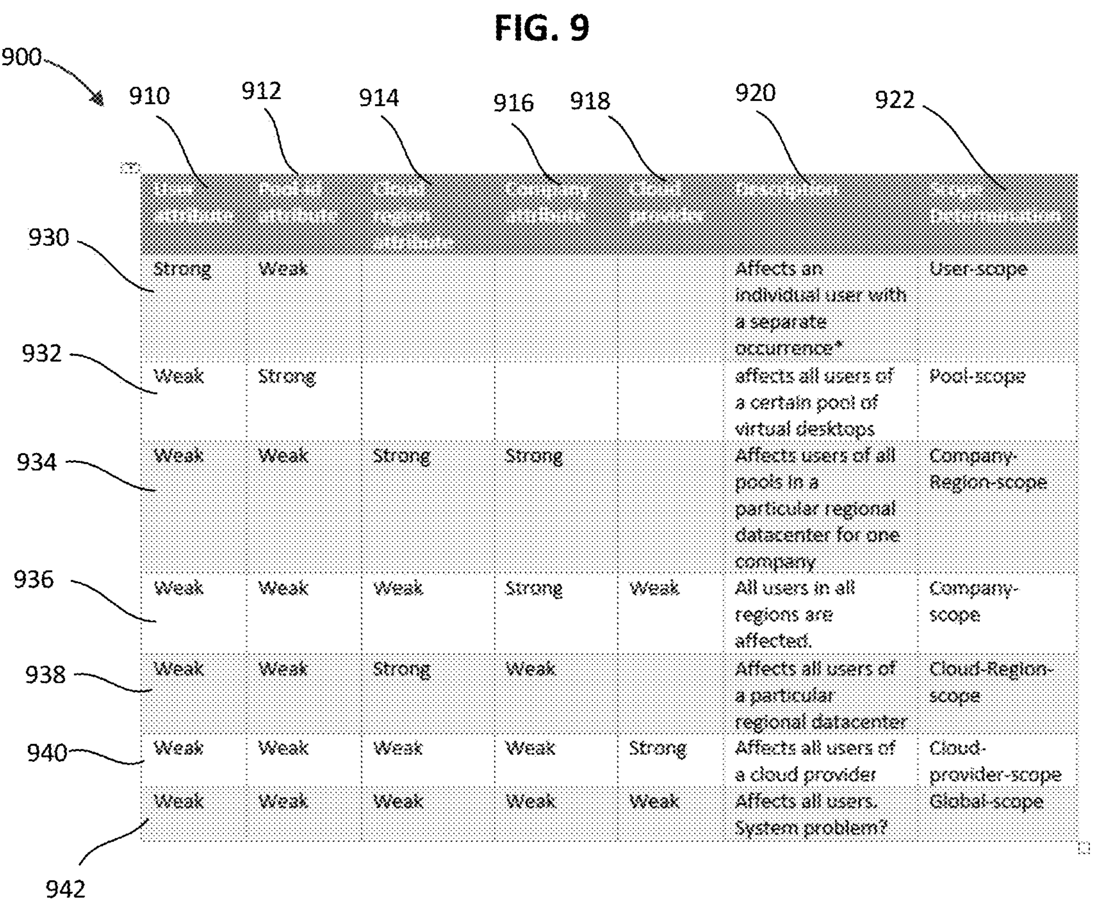

| User attribute | Pool id attribute | Cloud region attribute | Company attribute | Cloud provider | Description | Scope Determination |
|---|---|---|---|---|---|---|
| Strong | Weak | | | | Affects an individual user with a separate occurrence* | User-scope |
| Weak | Strong | | | | affects all users of a certain pool of virtual desktops | Pool-scope |
| Weak | Weak | Strong | Strong | | Affects users of all pools in a particular regional datacenter for one company | Company-Region-scope |
| Weak | Weak | Weak | Strong | Weak | All users in all regions are affected. | Company-scope |
| Weak | Weak | Strong | Weak | | Affects all users of a particular regional datacenter | Cloud-Region-scope |
| Weak | Weak | Weak | Weak | Strong | Affects all users of a cloud provider | Cloud-provider-scope |
| Weak | Weak | Weak | Weak | Weak | Affects all users. System problem? | Global-scope |

FIG. 10

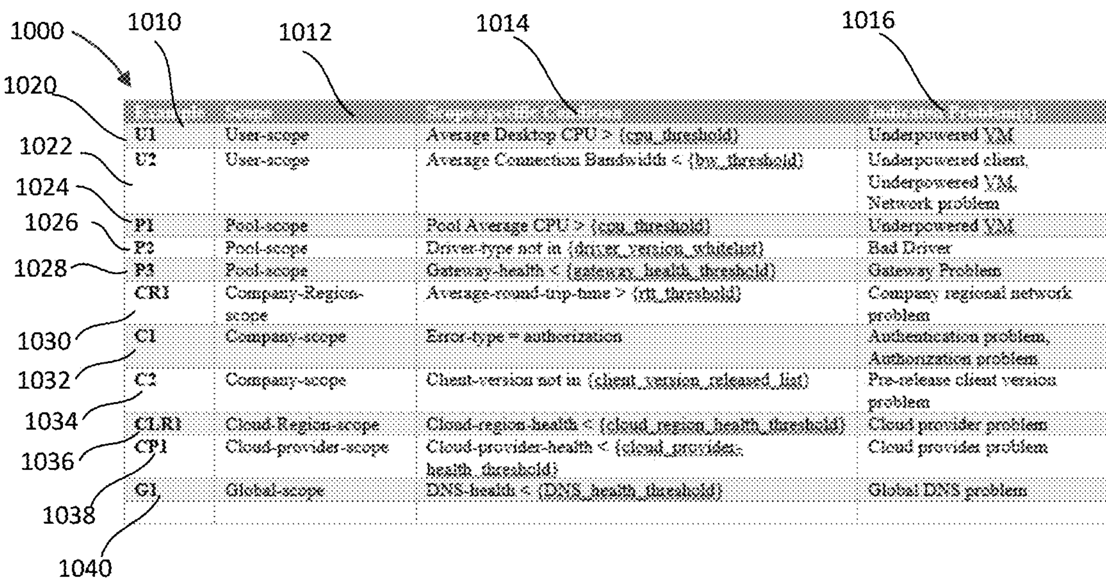

| [illegible] | [illegible] | [illegible] | [illegible] |
|---|---|---|---|
| U1 | User-scope | Average Desktop CPU > {cpu_threshold} | Underpowered VM |
| U2 | User-scope | Average Connection Bandwidth < {bw_threshold} | Underpowered client, Underpowered VM, Network problem |
| P1 | Pool-scope | Pool Average CPU > {cpu_threshold} | Underpowered VM |
| P2 | Pool-scope | Driver-type not in {driver_version_whitelist} | Bad Driver |
| P3 | Pool-scope | Gateway-health < {gateway_health_threshold} | Gateway Problem |
| CR1 | Company-Region-scope | Average-round-trip-time > {rtt_threshold} | Company regional network problem |
| C1 | Company-scope | Error-type = authorization | Authentication problem, Authorization problem |
| C2 | Company-scope | Client-version not in {client_version_released_list} | Pre-release client version problem |
| CLR1 | Cloud Region-scope | Cloud-region-health < {cloud_region_health_threshold} | Cloud provider problem |
| CP1 | Cloud-provider-scope | Cloud-provider-health < {cloud_provider_health_threshold} | Cloud provider problem |
| G1 | Global-scope | DNS-health < {DNS_health_threshold} | Global DNS problem |
| | | | |

METHOD AND SYSTEM FOR REAL-TIME IDENTIFICATION OF BLAST RADIUS OF A FAULT IN A GLOBALLY DISTRIBUTED VIRTUAL DESKTOP FABRIC

This application is a continuation of U.S. application Ser. No. 17/853,313, filed Jun. 29, 2022, which is incorporated by reference in its entirety.

TECHNICAL FIELD

The present disclosure relates generally to disaster analysis in network-based systems. More particularly, aspects of this disclosure relate to a global virtual desktop system with diagnosis capabilities to detect the blast radius of faults within the system.

BACKGROUND

Computing systems that rely on applications operated by numerous networked computers are ubiquitous. Information technology (IT) service providers thus must effectively manage and maintain very large-scale infrastructures. An example enterprise environment may have many thousands of devices and hundreds of installed software applications to support. The typical enterprise also uses many different types of central data processors, networking devices, operating systems, storage services, data backup solutions, cloud services, and other resources. These resources are often provided by means of cloud computing, which is the on-demand availability of computer system resources, such as data storage and computing power, over the public internet or other networks without direct active management by the user.

Users of networked computers such as in a cloud-based system may typically log into a computer workstation or client device and are provided a desktop application that displays an interface of applications and data available via the network or cloud. Such desktop applications will be initially accessed when a user logs in, but may remain active to respond to user operation of applications displayed on the desktop interface. While users may activate the desktop application on any computer on the network, most users work from one specific computer.

Remote desktop virtualization solutions have been available for over a decade. These solutions provide virtual desktops to network users. In remote desktop virtualization offerings, there is typically a capability of associating a remote desktop virtualization template in a particular datacenter with a remote desktop virtualization pool in the same datacenter as part of the general configuration model. This remote desktop virtualization template is customized with the image of the right desktop for a particular remote desktop virtualization use case.

A global desktop service system includes a large number of desktop service resources, including many virtual machines, virtual networks, and other services. Managing a global desktop service system, and ensuring that it is running in a performant, secure, and resilient fashion, can become very complex because of the large number of dependencies between desktop users and desktop service resources, and among desktop service resources. For example, there are numerous dependent components of a global desktop service system, any of which can cause a fault in that system that affects components directly or indirectly dependent on them. Such dependent components may include installed client software, endpoint client devices, the network used by the endpoint client devices, cloud APIs provided to manage virtual desktop infrastructure globally, regional resources utilized by cloud infrastructure providers, such as networks, gateway hosts, the virtual desktop hosts, agent services, the virtual desktop operating system, and computing, storage, and network services provided by the cloud infrastructure provider.

Even the normal interactions between these components can be complex, let alone where error conditions occur. As a simplified example of such a normal interaction, the global desktop service provisions both RDP gateways and virtual desktops, and orchestrates access between a client program and a particular virtual desktop. Because dependencies exist between these components, a fault in one of them will cause subsequent ripple effects that can appear as derivative failures. In order to maintain a high level of service availability, it is important that the chain of events that caused the visible problem has a discoverable root cause failure. Each component emits some kind of event trace for troubleshooting purposes, so a fault in any one of them can be individually analyzed to attempt to determine a root cause of the fault.

A virtual desktop service system depends on a globally distributed fabric of components and services. Components within the fabric can include configurations about and instantiations of virtual machines, created by cloud providers in a regional data center using physical components such as CPU, GPU, memory, persistent storage devices, network devices, network cabling and other hardware. Components of this fabric can also include configurations about and instantiations of virtual networks, created by cloud providers in a regional data center using physical components such as network hardware and software appliances. Services within the fabric can include programmatic interfaces to provide compute and storage resource management, user management, security, authentication, authorization, monitoring, billing, and other means of creating and manipulating fabric components.

Such a fabric that is previously in a stable and working state can experience an occurrence that can cause a significant negative impact or risk to the service provider and its customers. The occurrence is termed a major incident and the underlying problem may be termed as the root cause. The full list of system users affected is known as the blast radius. A problem that arises in a previously stable and working system is associated with a change to the system. There are some important stereotypes of a change that can cause a problem.

These and other factors make near-real-time identification of the root cause of a fault very difficult. Thus, there is a need for a blast radius analysis system that automatically identifies the blast radius of a major incident in near-real-time in order to identify affected users for a global desktop service system. Thus, there is also a need for a system that allows a determination of the scope of users based on attributes of problem reports.

SUMMARY

One disclosed example is a diagnostic system for determining a blast radius from a major incident in a virtual remote desktop system providing access to virtual desktops by client devices. The virtual remote desktop system has interconnected service components. The diagnostic system includes an event collection module coupled to the service components of the desktop system. The event collection module collects events from the service components. An aggregation module is coupled to the event collection module. The aggregation module merges the collected events in a time-ordered stream, provides context to the events in the time-ordered stream through relationships between the collected events, and generates a correlated event stream. An analysis module is configured to determine a stream of problem reports from the correlated event stream and determine a spike in the stream of problem reports. The analysis module determines the attributes of the problem reports in the spike to define the major incident. The analysis module determines a scope of the major incident and a corresponding attribute to determine a blast radius associated with the major incident in the desktop system.

A further implementation of the example system is an embodiment where the stream of problem reports includes a stream of change reports generated from change report events associated with changes in configurations in components in the desktop system. Another implementation is where the problem reports include at least one of an external problem report associated with an explicit error from a component of the desktop system. Another implementation is where the problem reports include at least one of an implied problem report inferred by a monitoring function based on rules from received messages from a component of the desktop system. Another implementation is where the scope is one of a user scope, pool of users scope, a company-regional scope, a company scope, a Cloud region scope, a Cloud provider scope, or a global scope. Another implementation is where the example diagnostic system includes a ticketing system providing tickets for producing problem reports for the stream of problem reports. The tickets originate from users of the desktop system. Another implementation is where the analysis module determines the scope by determining a concentration ratio from signifying attributes from the problem reports and a total count of problem reports in the spike. Another implementation is where the analysis module determines the scope by applying a supervised machine learning technique based on training a model with sample data. Another implementation is where the analysis module determines the scope by statistical analysis of signifying attributes from the problem reports to determine if a correlation of the signifying attribute is strong or weak. Another implementation is where the reporting module generates an interface on the display showing the blast radius. Another implementation is where the service components include at least one of installed client software, endpoint client devices, networks used by endpoint client devices, cloud APIs for managing virtual desktop infrastructure, regional resources, gateway hosts, virtual desktop hosts, agent services, virtual application servers, virtual desktop operating systems, computing services, storage services, and network services. Another implementation is where the diagnostic system includes a desktop service control plane coupled to the service components and other event sources. The desktop service control plane includes a monitoring service to report faults from the components. Another implementation is where the diagnostic system includes an event data repository storing the events, the event collection module being coupled to the event data repository and storing collected events to the event data repository. Another implementation is where the analysis module resides in the desktop service control plane. Another implementation is where the virtual remote desktop system includes agents monitoring events from the interconnected service components.

Another disclosed example is a method for determining a blast radius of a major incident in a virtual remote desktop system providing virtual desktops to client devices. The virtual remote desktop system has interconnected service components. Events of service components are collected from all service components traced to a fault. The collected events are merged in a time-ordered event stream. The collected events are correlated in the time-ordered event stream to show relationships across events to create a correlated event stream. A stream of problem reports is determined from the correlated event stream. A spike is determined in the stream of problem reports. The attributes of the problem reports in the spike are determined to define the major incident. A scope of the major incident and a corresponding attribute are determined to determine the blast radius associated with the major incident in the desktop system.

A further implementation of the example method is an embodiment where the stream of problem reports includes a stream of change reports generated from change report events associated with changes in configurations in components in the desktop system. Another implementation is where the stream of problem reports includes a stream of change reports generated from change report events associated with changes in configurations in components in the desktop system. Another implementation is where the problem reports include at least one of an external problem report associated with an explicit error from a component of the desktop system. Another implementation is where the problem reports include at least one of an implied problem report inferred by a monitoring function based on rules from received messages from a component of the desktop system. Another implementation is where the scope is one of a user scope, pool of users scope, a company-regional scope, a company scope, a Cloud region scope, a Cloud provider scope, or a global scope. Another implementation is where the example method includes providing tickets for producing problem reports for the stream of problem reports via a ticketing system. The tickets originate from users of the desktop system. Another implementation is where determining the scope includes performing statistical analysis of signifying attributes from the problem reports to determine if a correlation of the signifying attribute is strong or weak. Another implementation is where the determining the scope includes applying a supervised machine learning technique based on training a model with sample data. Another implementation is where the example method includes recommending a corresponding mitigating action based on the determined attribute. Another implementation is where the example method includes generating an interface on the display showing the blast radius. Another implementation is where the service components include at least one of installed client software, endpoint client devices, networks used by endpoint client devices, cloud APIs for managing virtual desktop infrastructure, regional resources, gateway hosts, virtual desktop hosts, agent services, virtual application servers, virtual desktop operating systems, computing services, storage services, and network services. Another implementation is where the virtual remote desktop system includes a desktop service control plane coupled to the service components and other event sources. The desktop service control plane includes a monitoring service to report faults from the components. Another implementation is where the virtual remote desktop system includes an event data repository storing the events. The event collection module is coupled to the event data repository and stores collected events to the event data repository. Another implementation is where the analysis module resides in the desktop service control plane. Another implementation is where the virtual remote desktop system includes agents monitoring events from the interconnected service components.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims.

BRIEF DESCRIPTION OF THE DRAWINGS

The disclosure will be better understood from the following description of exemplary embodiments together with reference to the accompanying drawings, in which:

FIG. 8 show a series of Venn diagrams showing the determination of scope of a major incident;

FIG. 9 is an example table of a configurable heuristics for determining scope based on determined correlations;

FIG. 10 is an example table of mapping of potential scope and scope-specific changes to candidate indicated problems;

Figure 1:
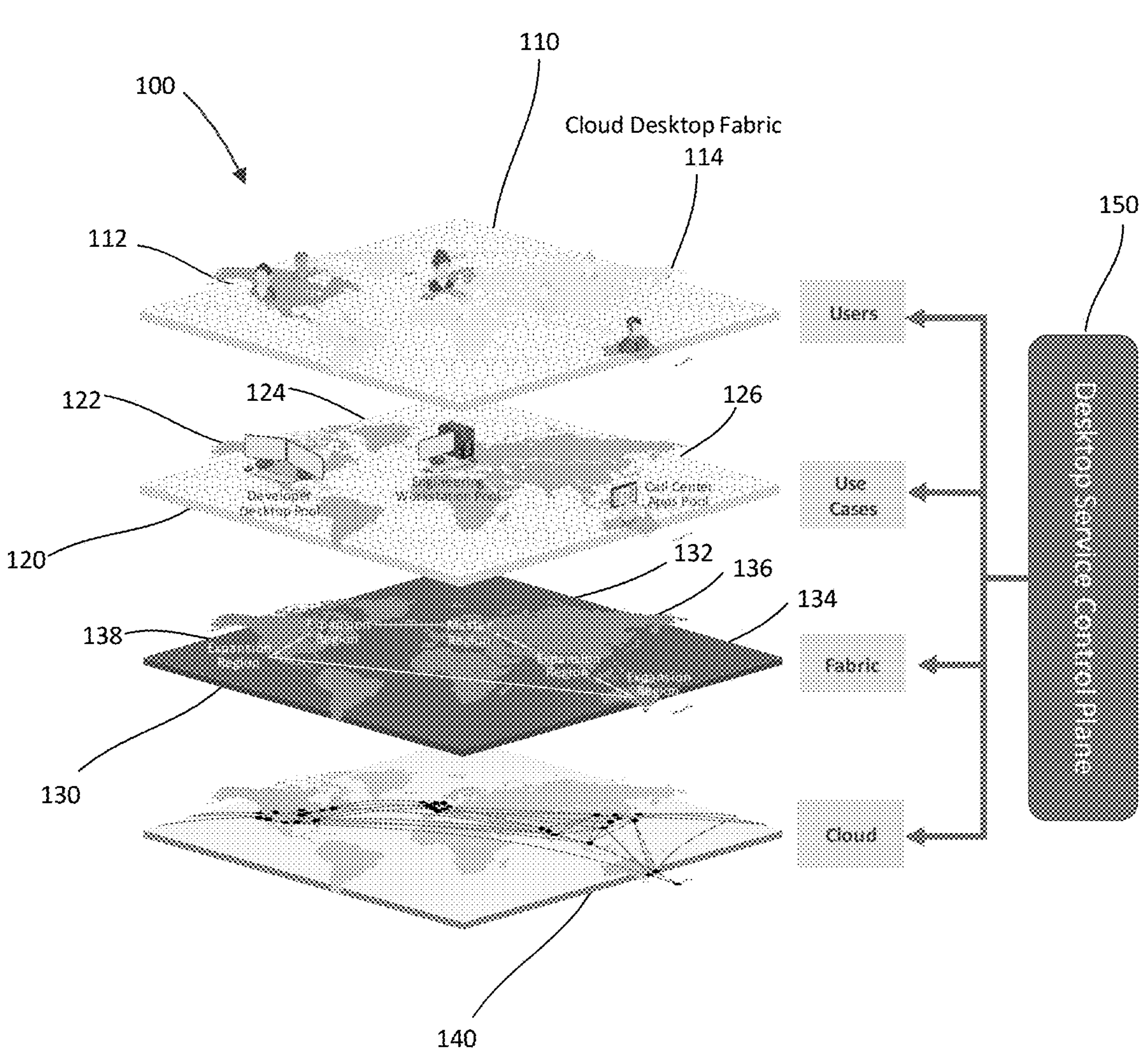
FIG. 1 is a high-level block diagram illustrating an example cloud desktop fabric allowing access to virtual desktops globally.

The present disclosure is susceptible to various modifications and alternative forms. Some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION OF THE ILLUSTRATED EMBODIMENTS

The present inventions can be embodied in many different forms. Representative embodiments are shown in the drawings, and will herein be described in detail. The present disclosure is an example or illustration of the principles of the present disclosure, and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

The following are definitions of terms used in this disclosure that relate in general to the virtual desktop system.

An agent is software that performs certain operations and monitoring tasks that has direct access to, or runs on, some virtual computing resource and may maintain a duplex communication channel with a desktop service control plane.

An API is a set of specific, controlled, well-defined functional entry points to get, create, update, and delete resources and otherwise change the state of a remote system.

A cloud API is, in this context, an API specific to an Infrastructure as a Service (IaaS) provider.

A connection broker is desktop service resource sometimes used to dynamically connect desktop clients with desktops.

A datacenter is a collection of computing resources, such as servers, in one physical location.

A desktop is a computer's interactive desktop or application, or other experience provided by remote desktop virtualization via a desktop service.

A client, or desktop client (sometimes called a VDI client) is a software application that provides display and input access to a desktop as part of a desktop service. It may be installed on a standard desktop or mobile operating system, or be pre-installed on dedicated hardware devices, or downloaded dynamically via a web browser application, or deployed in some other way. Like an agent, it may also perform certain operations and monitoring tasks and may maintain a duplex communication channel with a desktop service control plane.

A cloud desktop fabric is a scalable virtual desktop interface system that orchestrates multiple regional fabric regions to allow a user anywhere in different regions to access a virtual desktop interface.

A desktop service resource refers to some virtualized hardware, networking service, or virtual machine, other than the desktops themselves, that exists to support a desktop service.

A desktop service is remote desktop virtualization hosted on a public or private cloud, provided as a turnkey managed service.

A desktop service control plane is an application that implements and manages a desktop service.

A desktop user is a person who uses a desktop.

An enterprise connector is a desktop service resource used to integrate the network of a desktop service with the network services, including but not limited to directory services that support authentication and authorization.

A gateway, sometimes referred to as a protocol gateway, is a type of desktop service resource running a service that manages secure access to a desktop supporting protocols including a remote display protocol (RDP). In this disclosure, gateways are accessed as a gateway cluster unless explicitly noted otherwise.

A gateway cluster is a set of gateways managed together for load balancing purposes.

Infrastructure as a service (IaaS) is a set of virtualized computing resources available from a public cloud provider.

An infrastructure template is a collection of desktop service resources and/or definitions that provide a blueprint for replicating a regional cloud datacenter.

A multi-tenant desktop service control plane is a single desktop service control plane implementation that is used by multiple customers in such a way that no single customer is aware of or is impacted by activities of the others.

The term "near-real-time" refers to the processing timeframe of a system in which root cause information is produced without significant delay, close enough in time from the triggering events to be acted upon immediately to achieve business goals, typically measured as under one minute.

A non-persistent desktop user is a desktop user that is allocated a new desktop for each login session.

A persistent desktop user is a desktop user that is allocated a specific desktop for exclusive use over multiple connection sessions.

Pool desktops are a set of desktops managed by the desktop service control plane as a unit.

A regional cloud datacenter is a datacenter providing virtualized computing resources to implement a desktop service for efficient access within a single geography or availability zone.

Remote desktop virtualization is software technology that separates the desktop environment and associated application software from the physical client device that is used to access it in a client/server environment.

A virtual application is the capability to access a user experience for a particular application running remotely.

A virtualized computing resource is a virtual machine that is created by an Infrastructure as a Service (IaaS) provider.

A virtual machine is an emulation of a physical computer that can be accessed over a network.

A virtual network is hardware and software network resources combined into a single, software-based administrative entity, made available by an Infrastructure as a Service (IaaS) provider.

Virtual storage is storage resources provided as part of Infrastructure as a Service.

The following are definitions of terms used in this disclosure that relate to the blast radium diagnosis system for the virtual desktop system.

An admin event is an event generated by the desktop service control plane itself as it communicates with other elements of a global desktop service system.

An agent event is an event provided by an event source of a type agent in a global desktop service system. It is typically sent to the desktop service control plane by agent software running on a virtual desktop or other virtual machine.

A blast radius is a list of entities adversely affected by a problem or change.

A candidate root cause is an identified fault that is suspected but not proven to be a root cause.

A client event is an event provided by an event source of type client in a global desktop service system. It is typically sent to the desktop service control plane by client software running on the end-user's endpoint device as part of a global desktop service system.

A defect tracking system is a software application that keeps track of defects reported in development projects, often integrated with project management software or quality management systems.

A diagnostic system is a system that determines candidate root causes for a particular fault context that itself may not be the root cause, as well as blast radius for a major incident.

An event is a collection of information about something that occurs within a global desktop service system at a particular point of time, with distinct identity and distinct attributes.

An event attribute is a fact that provides information about one aspect of an event, represented by a name and a value. For example, an event describing a connection between two computers may have a "Connection Source" attribute with value "computer A," and an "Connection Target" attribute with value "computer B."

An event metadata attribute is an event attribute that can be considered to describe information about the sending of the event and not the original event information itself, including annotative attributes added during event analysis. An example of this might be the time an event is received, because this information was not provided as part of the original event attributes.

An event source is something that produces events that can be consumed by a diagnostic service.

An event stream is a time-ordered series of events that are generally more meaningful when analyzed together.

A fault context is some problem report that identifies the starting point for a diagnostic system. In other words, the fault context itself may not be the underlying root cause of the failure. For example, this could be a particular failing interaction with a global desktop service system at a particular time, such as a particular user, or a particular virtual desktop, where the root cause is not immediately understood.

A fully qualified domain name is a common technique to uniquely identify some object by a naming hierarchy as typically found in a Universal Resource Identifier (URI), email address, or any other system that relies on using a network domain as namespace with unique members within the namespace. For example, computer1.mynetwork.mycompany.com.

A knowledge article (KB) is information created and maintained within a KM system about a specific topic.

A knowledge management (KM) system is a tool that facilitates the creating, sharing, using, and managing the information for an organization.

A major incident is a significant negative impact or risk to a service provider and its customers.

A regular expression is a syntax in which a sequence of characters defines a search pattern for text.

A root cause is an underlying fault somewhere in a global desktop service system that can cause other failures to manifest themselves in a chain of cause-effect relationships. For example, if A fails because of a fault completely within itself, it can cause B to fail. If B fails, it can cause C to fail. Thus, the root cause of failure C is failure A.

A universally unique ID (UUID) is a long number that can be generated in such a way as to be unique for all practical purposes, without the use of a central authority to guarantee that.

The present disclosure is directed toward a method for detecting and determining the blast radius of a major incident in a cloud-based desktop service system. First, observable problem reports and change reports are continuously monitored from the system. Such reports are derived from different events that are monitored from components in the system. A major incident is detected as a spike in problem reports is detected. Then the scope of the incident is determined by analyzing scope signifying attributes of the problem reports included in the spike. Then the scope is used to test scope-specific problem attributes that are mapped to a candidate root cause, and scope-specific change attributes are used to validate the candidates and identify a change as the root cause. The impact of the major incident is evaluated by examining users that are potentially affected by the change, and determining relevant actions that can be taken, such as reversing a recent change, taking a problematic service or component offline, dynamically provisioning additional resources, or updating a security configuration profile.

FIG. 1 shows a high level block diagram of a cloud desktop service system 100. The cloud desktop service system 100 may also be referenced as a global desktop system because it provides virtual desktops for users globally. The cloud desktop service system 100 includes four layers, a users layer 110, a use cases layer 120, a fabric layer 130, and a cloud layer 140.

The users layer 110 represents desktop users having the same computing needs, that may be located anywhere in the world. In this example, the users layer 110 includes users 112 and 114, who are in geographically remote locations and access desktops via computing devices.

The use cases layer 120 represents common logical global pools of desktops available to serve the users, whereby each global pool is based on a common desktop template. There can be multiple global pools based on which groups users belong to and their job requirements. In this example, the pool for the users 112 and 114 may be one of a developer desktop pool 122, an engineering workstation pool 124, or a call center application pool 126. Pools such as the developer desktop pool 122 or the engineering workstation pool 124 allow users in the pool a desktop that allows access to graphic processing unit (GPU) based applications. Other example applications may include those applications used for the business of the enterprise, for example, ERP (enterprise resource planning) applications or CRM (customer relationship management) applications. These applications allow users to control the inventory of the business, sales, workflow, shipping, payment, product planning, cost analysis, interactions with customers, and so on. Applications associated with an enterprise may include productivity applications, for example, word processing applications, search applications, document viewers, and collaboration applications. Applications associated with an enterprise may also include applications that allow communication between people, for example, email, messaging, web meetings, and so on.

The fabric layer 130 includes definitions and configurations for infrastructure and desktop service resources, including gateways, desktop templates, and others. The resources are maintained as fabric regions such as a master fabric region 132, and expansion fabric regions 134, 136, and 138. As will be explained below, the fabric regions such as the regional fabric regions 134, 136, and 138 can be added or removed as needed. The master fabric region is the configuration of record.

The cloud layer 140 implements the resources defined by the use case layer 120 and fabric layer 130, including virtual desktops, infrastructure, and other virtual resources, all of which are virtual machines or other virtual resources hosted in a public cloud.

The layers 110, 120, 130, and 140 are created and orchestrated by a desktop service control plane 150 that can touch all the layers. The desktop service control plane 150 is a key component to orchestrate a cloud desktop service system such as the cloud desktop service system 100 in FIG. 1. The desktop service control plane 150 can manage the entire lifecycle of a desktop service implementation, from creating and managing the required desktops, to monitoring and analyzing the stream of operational data collected, enforcing security policies, and optimizing the experience for IT administrators and desktop users. For example, the desktop service control plane 150 may register a set of a virtual networks, virtual storage resources, and more. Within a virtual network, the control plane 150 may further register and coordinate the use of gateways, enterprise connectors, desktop templates, connection brokers, and more.

The two desktop users 112 and 114 in different parts of the world who are each able to access an example high-performance desktop service from the cloud desktop service system 100. As will be explained below, the cloud desktop service system 100 eliminates the need to divide users with similar requirements into user groups specific to a region. Rather, all users having similar needs throughout the world are considered as a single worker pool. Users, such as users 112 and 114, each may use a client device to access the desktop service. Client devices may be any device having computing and network functionality, such as a laptop computer, desktop computer, smartphone, or tablet. Client devices execute a desktop client to access remote applications such as the desktop. The client application authenticates user access to the applications. A client device can be a conventional computer system executing, for example, a Microsoft™ Windows™-compatible operating system (OS), Apple™ OS X, and/or a Linux distribution. A client device can also be a client device having computer functionality, such as a personal digital assistant (PDA), mobile telephone, tablet, video game system, etc.

Figure 2:
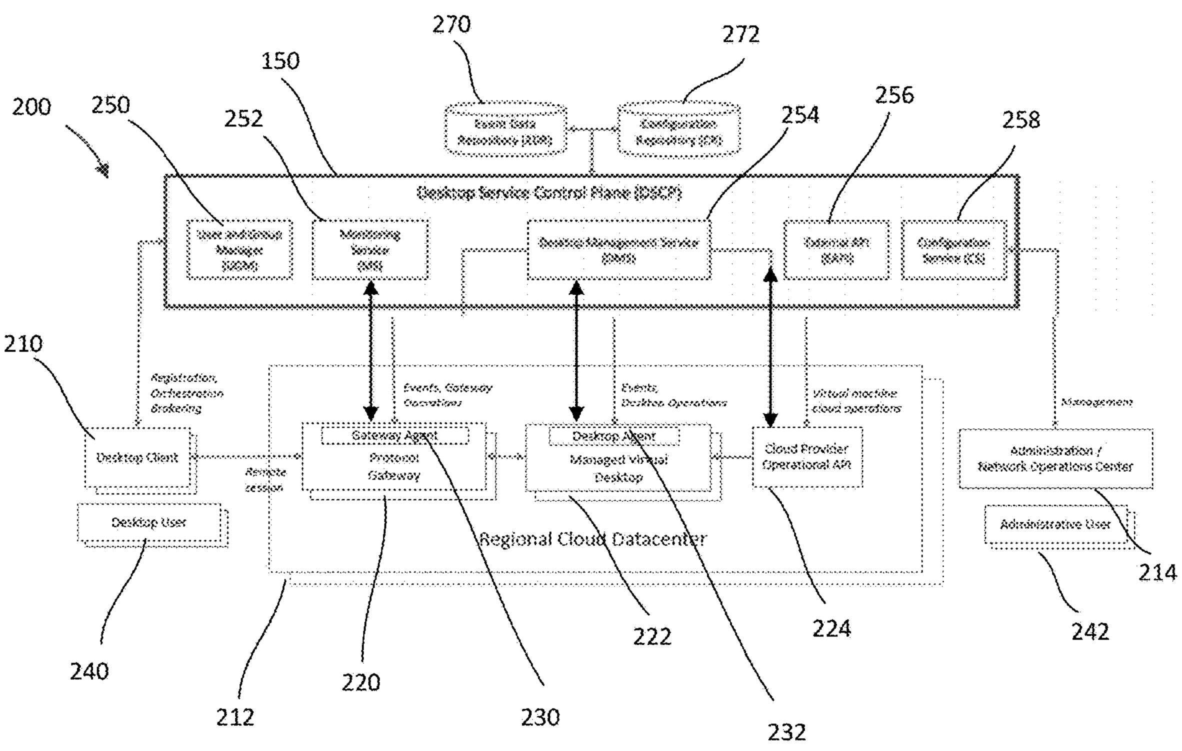
FIG. 2 is a block diagram of a regional data center and desktop service control plane of the example cloud desktop fabric in FIG. 1.

FIG. 2 is a block diagram of some examples of components of the global desktop service system 100, including an example set of desktop clients 210, a regional cloud datacenter 212, and an administration center 214, that interact with and can be orchestrated by the desktop service control plane 150. The desktop client 210 communicates with the desktop service control plane 150 in order to be registered with the fabric, assigned a desktop, remotely configured, and for other purposes. There may be multiple regional cloud datacenters similar to the regional cloud data center 212, but only one data center is shown in detail for simplicity of explanation. The regional cloud datacenter 212 may include a set of protocol gateways 220, a set of managed virtual desktops 222, and a cloud provider operational API 224. These components all communicate with the desktop service control plane 150. Such datacenters include servers that host the various applications. The datacenter typically comprises IT infrastructure that is managed by IT personnel. The IT infrastructure may include servers, network infrastructure, software, and so on. If there is an issue related to an application reported by a user, the IT personnel can check the health of the infrastructure used by the application. A datacenter may include a firewall to control access to the applications hosted by the datacenter. The firewall enables computing devices behind the firewall to access the applications hosted by the datacenter, but prevents computing devices outside the firewall from directly accessing the applications. The firewall may allow devices outside the firewall to access the applications within the firewall using a virtual private network (VPN).

The protocol gateway 220 may be present to provide secure public or internal access to the managed virtual desktops. A gateway agent 230 is software that is deployed on that gateway host by the desktop service control plane 150, and serves to monitor the activity on the gateway 220, and enable the desktop service control plane 150 to assist in configuration and operations management of the gateway 220.

The example desktop client 210 is software and device hardware available in the local environment of a desktop user 240 to remotely access a managed virtual desktop using a remote desktop protocol. The desktop client 210 communicates with the desktop service control plane 150 and also supports a remote display protocol in order for users to connect to a desktop application run by the regional cloud datacenter 212.

The managed virtual desktop 222 is itself provisioned and maintained by the desktop service control plane 150. A desktop template may be used to manage pools of such managed virtual desktops. The desktop template is configured to provide remote access to the desktop client 210. A desktop agent such as desktop agent 232 is software that is deployed on that managed virtual desktop by the desktop service control plane 150, and serves to monitor the activity on the managed virtual desktop, and enable the desktop service control plane 150 to assist in configuration and operations management of it.

The cloud provider operational application programming interface (API) 224 presents services provided by the cloud provider that also participate in the management of the virtual machine. This can be utilized by a desktop service control plane 150 to perform operations like provisioning or de-provisioning the virtual machine.

Administrative users 242 can interact with operations reporting interface software at the administration center 214 that allows management and administration of the desktop service control plane 150.

Other components and services may interact with the desktop service control plane but are omitted from FIG. 2 for simplicity, such as enterprise connectors, network monitoring services, customer relationship management (CRM) systems, and many others.

The desktop service control plane 150 itself can perform many internal centralized functions also not depicted in in FIG. 2, including pool management, user and group management, cloud service adapters, virtual desktop templates, data analysis, high-availability management, mapping users to the optimal regional data center, security policy management, monitoring, compliance, reporting, and others.

The control plane 150 includes a user and group manager 250, a monitoring service 252, a desktop management service (DMS) 254, an external API (EAPI) 256, and a configuration service (CS) 258. The control plane 150 may access an event data repository 270 and a configuration repository 272. Although only one regional datacenter 212 is shown in detail, it is to be understood that the control plane 150 may facilitate numerous regional datacenters.

The monitoring service 252 makes both routine and error events available to administrators and can analyze operational performance and reliability. The desktop management service 254 interacts with the one or more managed virtual machines (MVMs) 222 in the regional cloud datacenter 212.

The administration center 214 works directly with the desktop service control plane 150 as its primary human interface. The administration center 214 allows the administrative user 242 to configure the functions of the control plane 150 through the configuration service 258. The configuration service 258 supports editing and persistence of definitions about the desktop service, including subscription information and policies.

The global desktop service system 100 includes a large number of desktop service resources, including many virtual machines, virtual networks, and other services. Managing a global desktop service system, and ensuring that it is running in a performant, secure, and resilient fashion, can become very complex because of the large number of dependencies between desktop users and desktop service resources, and among desktop service resources. Any dependent component of a global desktop service system may cause a fault in that system that affects components directly or indirectly dependent on them. These could include installed client software, endpoint client devices, a network used by the endpoint client device, cloud APIs provided to manage virtual desktop infrastructure globally, regional resources utilized by cloud infrastructure providers, such as networks, gateway hosts (for example, providing the Remote Desktop Protocol for application virtualization), virtual desktop hosts, accessible via a protocol such as the Remote Desktop Protocol, agent services that report the health of the virtual desktop host, or virtual application server to a desktop service control plane 150, virtual desktop operating systems, such as Windows 10, computing services of the cloud infrastructure provider, storage services of the cloud infrastructure provider, and network services of the cloud infrastructure provider. A regional datacenter such as the regional datacenter 212 may implement all these services.

Even the normal interactions between these components can be complex, let alone error conditions. As a simplified example of such a normal interaction, the global desktop service system 100 provisions both RDP gateways and virtual desktops, and orchestrates access between a client program and a particular virtual desktop.

The global desktop service system 100 in FIG. 1 depends on the globally distributed fabric of components and services as explained above. Such a service in a stable and working state can experience a problem that can cause a significant negative impact or risk to the service provider and its customers. The negative impact is termed a major-incident and the underlying problem is termed as the root cause. The full list of users in the system affected by the major-incident is known as the blast radius.

A problem that arises in a previously stable and working system may be associated with a change to the system. There are some important stereotypes of a change that can cause a problem. In this example, the change stereotypes may include a fault change, an upgrade change and a reconfiguration change. A fault change is a result of a physical fault. In a fault change, a component of the system suffers from a physical fault because its operation exceeds its designed tolerances, such as load, heat, age, and so on, or was simply defective. For example, a remote display protocol gateway may stop performing its functions because it was running on a virtual machine whose physical host has lost power due to some physical failure.

An upgrade change is a result of a hardware or software installation that causes at least one component or service to become incompatible with each other. For example, a GPU driver on a virtual machine running the Windows Operating System may be automatically updated, but the remote display protocol service on that host requires the older version of the driver.

A configuration change is a change in the configuration of one component or service. For example, a policy was reconfigured to enforce a stricter security protocol, causing some services to reject requests that do not meet the new protocol requirements.

Figure 3:
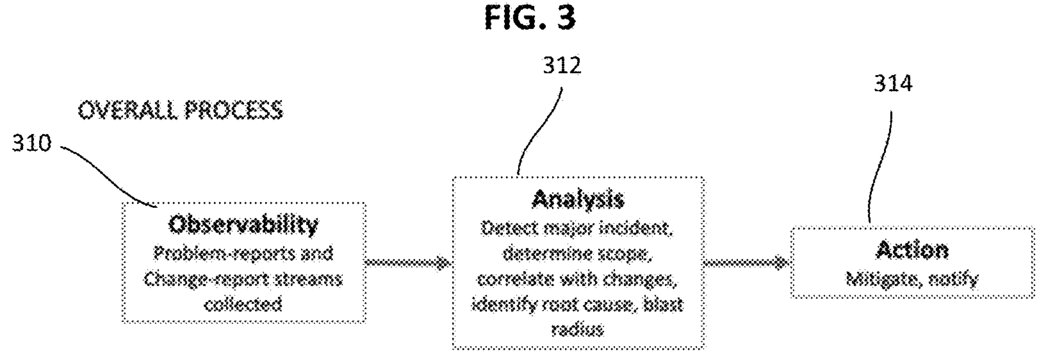
FIG. 3 is a diagram of the overall process for determining a major incident and taking action.

In the example process, two outputs are automatically determined as quickly as possible to enable further actions. First, identification of underlying problem (the root cause) is determined. Second, identification of the blast-radius (list of affected users) is determined. In order to derive this, the method shown in FIG. 3 is performed. First, an observability phase (310) occurs where problem reports and change report event streams are collected from the global system 100 via a diagnosis system operated by the desktop service control plane 150. The diagnosis system then performs an analysis phase (312). The analysis phase 312 includes detecting a major incident, determining the scope, correlating the incident with changes to the system 100, identifying the root cause and identifying the blast radius. Finally, the diagnosis system determines action (314) which may include mitigation of the problem and notification to affected users or other actions.

The observability phase consists of monitoring both problem reports and change-reports as will be explained above. Each of these reports are maintained as a searchable stream. Both the problem reports and change reports are relevant to determining the root cause and blast radius.

One method for determining a root cause is disclosed in co-pending U.S. application Ser. No. 17/233,127 filed on Apr. 16, 2021, titled "Method and System For Real-Time Identification of Root Cause of a Fault in a Globally Distributed Virtual Desktop Fabric." The contents of that application are hereby incorporated by reference in their entirety.

In the example disclosed in the U.S. application Ser. No. 17/233,127, a method is specified for a diagnostic system that collects and analyzes events from a variety of components and agents in the global desktop system 100 in FIG. 1, and correlates them with configuration information in a single time-ordered stream. The principles disclosed herein elaborate on that method to specify that the context that triggers analysis of root cause is a continuous analysis of that stream. Furthermore, the types of events can be classified as both problem reports and the change reports.

Figure 4:
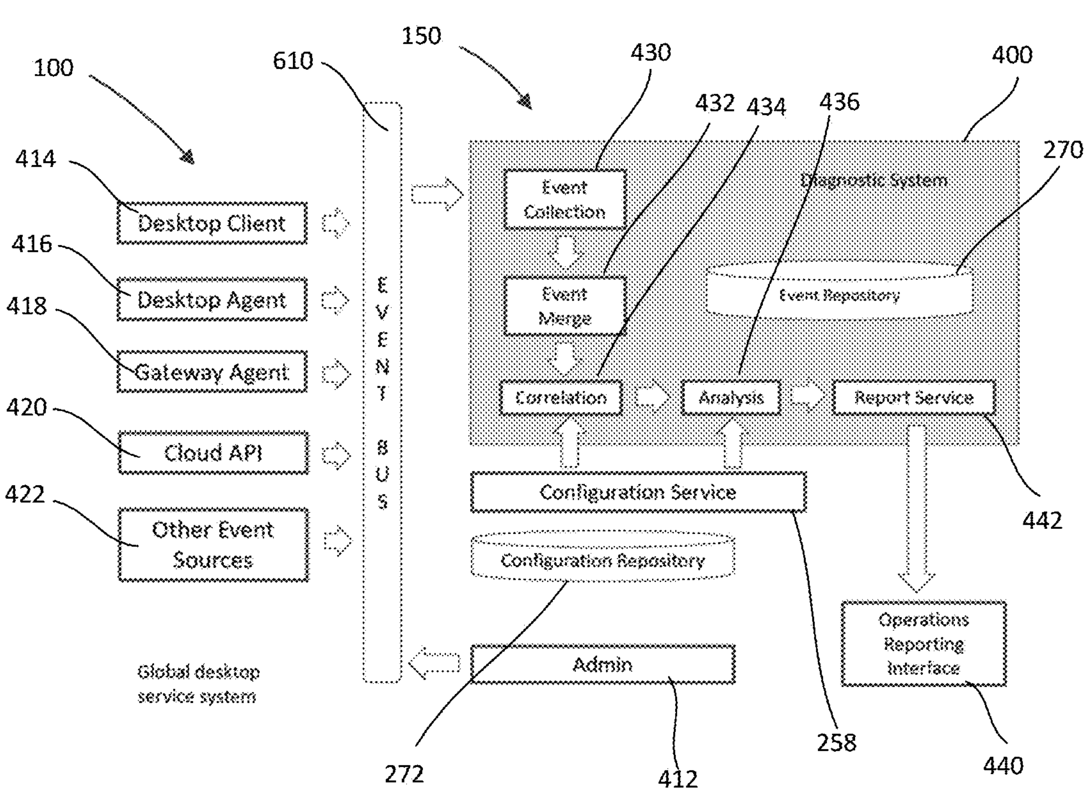
FIG. 4 is an example of a diagnostic system for determining the root cause and blast radius of a major incident in the system in FIG. 1.

FIG. 4 shows a block diagram of the flow of data processing that may support the root cause and blast radius analysis. In other implementations, the functions may be combined or organized differently to achieve the same result. FIG. 4 shows an example diagnostic system 400 is executed by the example desktop service control plane 150. The example diagnostic system 400 of the desktop service control plane 150 can collect information from different event sources through an event bus 410. The different event sources may include administrative commands 412, desktop clients 414, desktop agents 416, gateway agents 418, cloud API providers 420, and other event sources 422. The diagnostic system 400 performs a process to provide problem reports. The process includes collection of events from the different event sources (430). The different collected events are merged (432). Correlation between the merged events is then determined (434). Analysis of the correlated events is then performed for the root cause and blast radius (436). The diagnostic system 400 then reports this information to an example operations reporting interface 440 of the administrative center 214.

Many different types of events may be collected for the purposes of the diagnostic system. The term "type of event" indicates a particular set of attributes that generally are present in a recurring scenario. For example, a "client connection event" is a type of event that occurs within a global desktop service system when a desktop client establishes a connection with a virtual desktop. Such a type of event may always include attributes such as "connection time", "client ip address", and "virtual desktop ip address." Events are collected from each component acting as an event source. For example, agents may be event sources. Other event sources are not agents but other services, like the Cloud API provider.

Event types typical to a global desktop service system such as the system 100 can include: a client connection success event; a client connection failure event; a virtual desktop session start event; a virtual desktop session termination event; a virtual desktop session status event; a virtual desktop configuration change event; control plane administrative commands; and control plane administrative command responses.

There are various implementations of the event gathering that are possible. In one possible implementation, all events can be forwarded to the single collection service or module in real time as they occur. In other implementations, some or all of the event information may be collected on demand from distributed event repositories throughout the system 100.

In this example, the event bus 410 forwards a copy of event data to the event collection and merge processes 430 and 432 of the diagnostic system 400. The correlation and analysis functions 434 and 436 also access the configuration service 258 that includes data stored in the configuration repository 272. In this example, the collected event data is stored in the event data repository 270. The diagnostic system 400 includes a report service 442 that generates problem and change reports on root cause analysis. The generated reports on the blast radius analysis from the report service 442 are sent to the example operations reporting interface 440 of the administrative center 214.

The diagnostic system 400 allows root causes and corresponding blast radius to be discovered in real-time, or near-real-time. This prevents the failure from propagating to more users with larger disruption to system operation. The example root cause analysis automatically identifies the root cause of a fault and the blast radius of the fault in near-real-time in order to maintain high availability for a global desktop service system.

The diagnostic system 400 collects data on events. The system continuously collects these event traces from all global event trace sources in the system 100 under the collection operation. The diagnostic system 400 merges collected events. The diagnostic system 400 thus provides a unified, time-ordered view of the merged event streams, and may standardize common attributes. The diagnostic system then correlates the collected events. In correlation, the diagnostic system provides context for event streams by generating additional event attributes to show relationships across events. The diagnostic system 400 can use configuration data provided by a desktop service control plane 150 to discover these relationships. The diagnostic system then analyzes the correlated events. In analysis, the diagnostic system 400 evaluates multiple logical rules appropriate to analyze the merged event stream, identify abnormal patterns in the events, match them against event patterns of known problems, and produce a ranked list of candidate root causes. The diagnostic system 400 also determines the blast radius based on the event stream by determining the scope of the incident based on problem report streams produced from the merged event stream. The diagnostic system 400 then produces a report of the analysis. The report allows troubleshooting of event streams, and reports the candidate root cause in a specific context. In addition to a stand-alone diagnostic system 400, another example implementation of a diagnostic system may be embedded within the desktop service control plane 150 as an integrated diagnostic service. This facilitates the correlation and reporting aspects of the diagnostic system.

The process of collection and assembling event streams collects events from different streams created by different sources such as a client, an administrator, or an agent. Separate event streams are merged and ordered in a time sequence. The collected events consist of attribute name/value pairs. During the event collection phase, all of these events are captured and may be logged, indexed, or otherwise made available to a diagnostic service implementation. The event merge phase standardizes the events and creates a single chronologically-ordered stream.

A standard attribute of all events may include the date/time of the event, a unique event ID, an event source, a notion of event type. The event merge service provides a way to order these events in absolute chronological order, regardless of the date/time representation. Standardized metadata attributes are added to each event in the merged event stream, as described earlier.

To prepare for fault analysis, the diagnostic system 400 provides context for event streams, by understanding and reconciling divergent representations of event attributes from different event trace sources. In some implementations, this processing may occur at the same time as the merging of event streams. In other implementations, the processing may occur in a subsequent phase either as events arrive, on an as-needed basis, or on a periodic basis.

Figure 5:
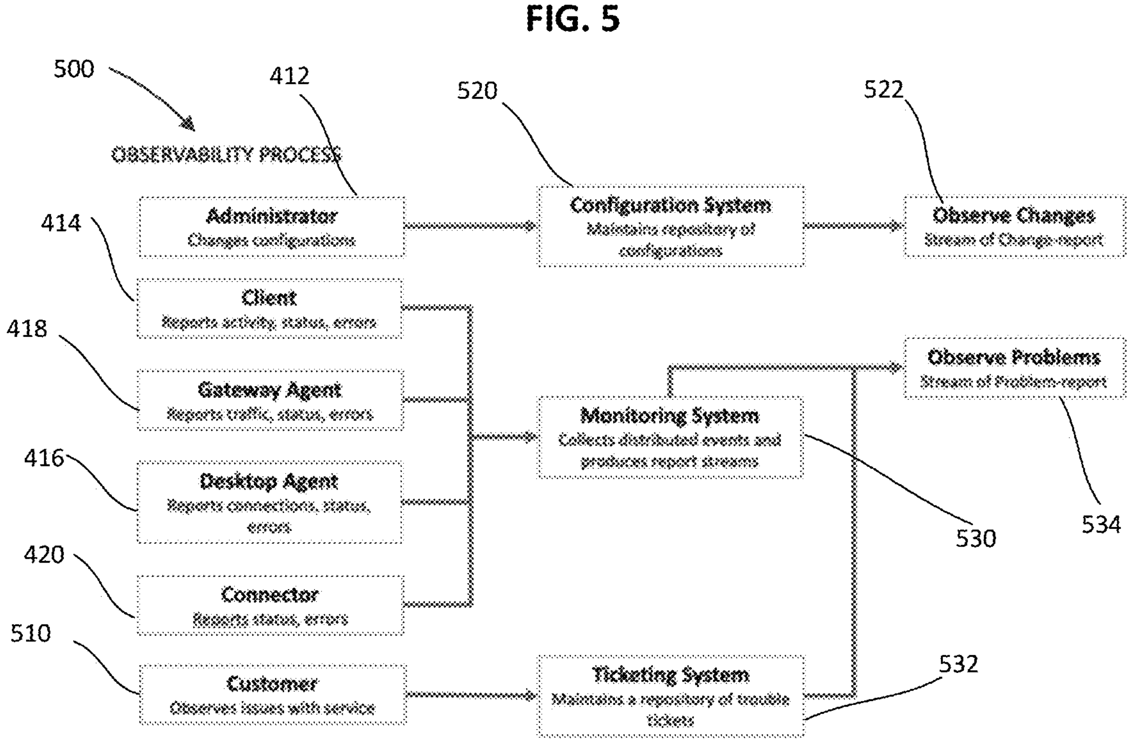
FIG. 5 is a flow diagram of the observability process in FIG. 3 from an example diagnostic system for blast radius analysis.

FIG. 5 shows an example process 500 for collecting types of events that constitute the observability phase 310 in FIG. 3. The process 500 includes the administrative commands from an administrator source 412, the client source 414, the desktop agent source 416, the gateway agent source 418, a connector source, and a customer source 510. Each of the sources 414, 416, 418, and 420 may create events or configurations that may be used for the blast radius analysis in the form of change reports and problem reports.

The administrator source 412 represents a system administrator changing the configurations of different elements of the system 100. The changes are sent to a configuration system 520 that maintains a repository of configurations such as the configuration repository 272 in FIGS. 2 and 4. The configuration system 520 prepares a change report for each change. The change reports are compiled in a stream of change reports that constitute an observation of change reports 522. The client source 414, gateway agent source 418, desktop agent source 416, and connector source 418 provide reports to a monitoring system 530. The monitoring system 530 collects distributed events from the different sources and produces report streams. The customer source 510 are users of the client devices that access the virtual desktops generated by the system 100. The users thus observe issues with service and send reports to a ticketing system 532. Each report by a user constitutes a ticket maintained by the ticketing system 532. The ticketing system 532 maintains a repository of trouble tickets. A stream of problem reports 534 is produced by the combined collected data from the monitoring system 530 and ticketing system 532.

A problem report is an indication of an underlying problem specific to one point of time. As an observer of the system, the disclosed method requires access to an input stream of problem reports in order to analyze them in context. The stream of problem report data is the subject of continuous analysis. In this manner, the diagnostic system 400 can identify a major incident in an automated fashion.

Each problem report is defined by a timestamp attribute, and a set of one or more additional attributes. A problem report attribute is any name/value pair specifying a fact about a problem report. Not all problem reports have the same set of attribute names. Only the timestamp attribute is required, though in practice most useful problem reports in the referenced system will have a company-id attribute populated.

Not all problem reports arrive fully formed from external sources. There are two kinds of problem reports. An external problem report is an explicit error or concern that is received by the system. An implied problem report may be inferred by the monitoring function of the control plane 150 based on rules. For purposes of identifying root cause and blast radius, the disclosed method treats both kinds of problem reports the same way.

Figure 6A:
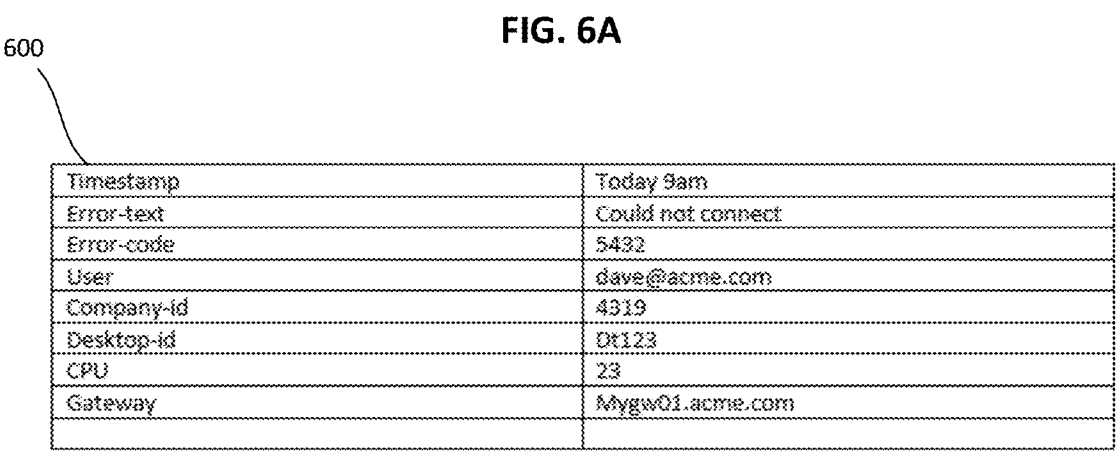
FIG. 6A-6C show tables of example events used for a problem report stream.

FIG. 6A is a table 600 of an example external problem report. The table 600 is described in attribute/value pairs. The table 600 includes eight example attribute value pairs, including timestamp, error-text, error code, user, company-ID, desktop-ID, CPU, and gateway. These attribute names identify types of information that may be relevant to a problem report. For each problem report, each attribute has a corresponding value that provides information about this specific problem report. For example, the attribute, error-text, has a corresponding value for a specific problem report that describes the specific error that occurred. The diagnostic system 400 can use previously identified attributes to classify and analyze problems.

An implied problem report is created and added to the stream of problem reports based on a pre-configured rule. An example rule may be that a critical condition is implied by CPU consumption being greater than 90%. In this case, the attributes of the problem report are generated by the system monitoring process that is constantly evaluating sampled CPU readings from endpoints. Some of the attributes are taken from external inputs to the monitoring system, and some are specified by the output of the rule.

Figure 6B:
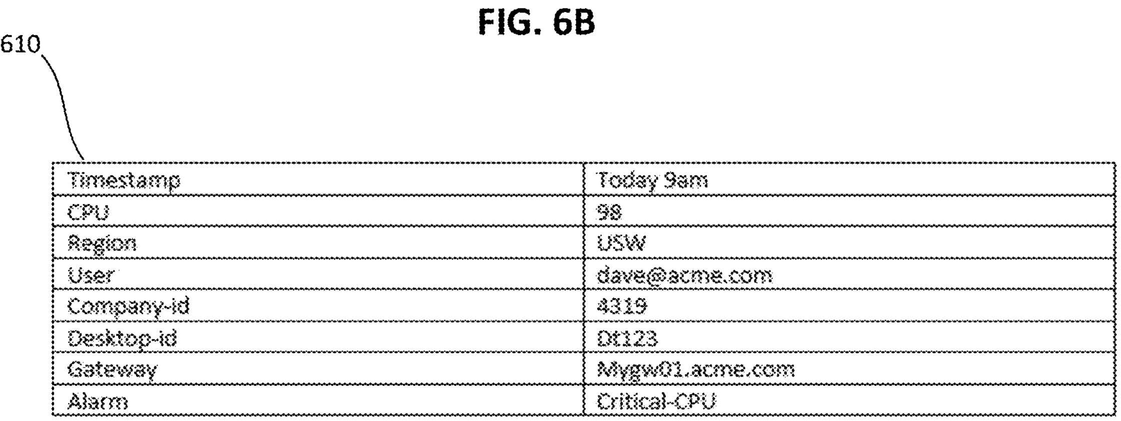

FIG. 6B is a table 610 of an example an implied problem report. In this example, the alarm attribute value is specified by the rule that created it. The table 610 includes eight attribute value pairs. The attributes include the timestamp, the CPU, the region, the user, the company-ID, the desktop-ID, the gateway and the alarm. The table 610 includes corresponding values for each attribute. Using the rule described above as an example, a diagnostic system 400 will set the output of the rule as the alarm attribute value of "Critical-CPU." If the condition of the rule is not met, the attribute may be populated with some other value or the attribute may not be generated at all.

Figure 6C:
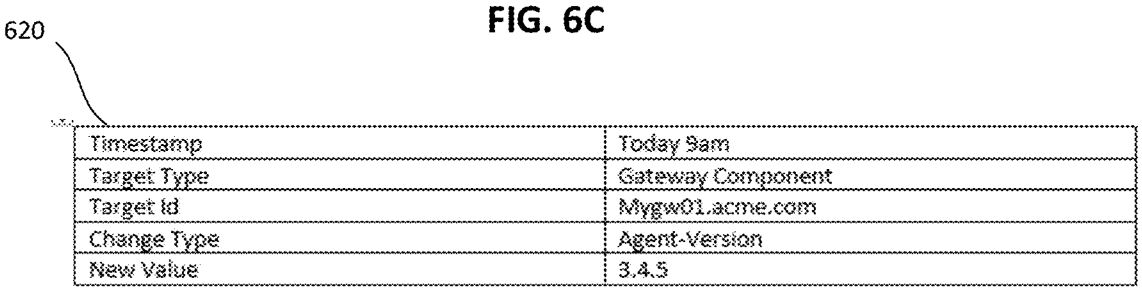

The same event stream that provides error reports can also provide a stream of routine changes to the system known as change reports, that by themselves do not necessarily indicate a problem has occurred. FIG. 6C shows a table 630 of an example change report. The table 630 includes five attribute/value pairs. The attributes in this example include the timestamp, the target type, the target-ID, the change type and the new value of the change. The change report table 630 includes the corresponding values for each of the attributes that include metadata or other information about the change, including a changed value of something, the type of change, the time of the change, and the component that was changed.

Figure 7:
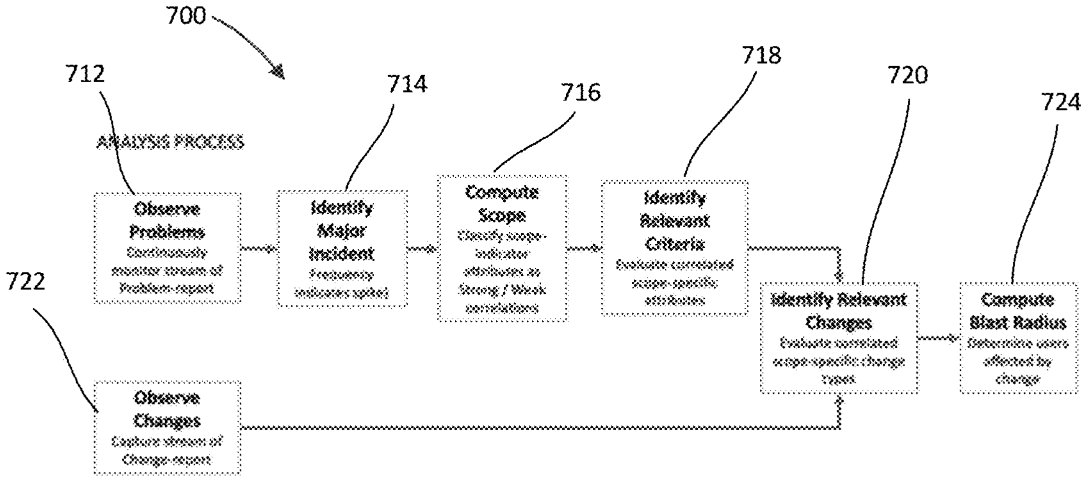
FIG. 7 shows a detailed diagram of the analysis process performed by the diagnostic system in FIG. 4.

The analysis process 312 in FIG. 3 is shown in detail in FIG. 7. The process 700 first monitors streams of problem reports (712). The process then identifies a major incident based on a frequency of problem report streams as a spike (714). The process then computes the scope of the incident based on the problem report streams (716). The process then identifies relevant criteria (718). The process then takes the relevant criteria and a stream of change reports (722) to identify relevant changes in the change reports (720) that may be the cause of the problem. The process then computes the blast radius of users affected by the identified attribute of a problem report (712) or a change report (722).

The identification of a major incident in computing the blast radius occurs as follows. In order to determine if there is a major incident, the problem reports stream is continuously observed in order to identify a spike. A spike is defined as a cluster of statistically significant anomalies in the frequency of new problem reports. Anomalies (sometimes called outliers) are data points that can be determined not to "belong" to any predictable pattern when analyzing time-series data. For example, a monitoring system typically observes a connection failure rate of 1% of all attempts. However, over a one hour period, the connection failure rate may rise to 40%. This could be considered a significant anomaly and could indicate that a major incident (724) has occurred.

Detection of spikes is a well-known data-science problem and there are many known techniques to solve it. For example, a standard deviation approach, boxplots, DBScan clustering, or the isolation forest algorithm may all be used to detect spikes. These techniques, or others that achieve the goal of detecting spikes in the frequency of new problem reports.

Such an analysis is improved by defining certain attributes that help classify data points as being related to each other. An example of an attribute that assists in classifying related data points is the "error code" attribute provided in a problem report. A spike of problem reports with the same "error code" value is given more weight as a probable major incident then a spike of problem reports with no common context. Another type of analysis for the spike of problem reports may be conducted through machine learning.

The problem scope 716 is determined as follows. When a major incident has been identified from the spike, the problem scope is determined for further analysis. There are different identified classes of the users of a distributed global virtual desktop service, identified by whether there is a significant mix of values for certain defined attributes. A significant mix means that the spike includes problem reports that span the logical boundary associated with those attributes. In this example, there are several different scopes including a user scope, a pool user scope, a pool scope, a company region scope, a Cloud region scope, a Cloud provider scope and a global scope. The user scope is the smallest, while the global scope is the largest.

Figure 8:
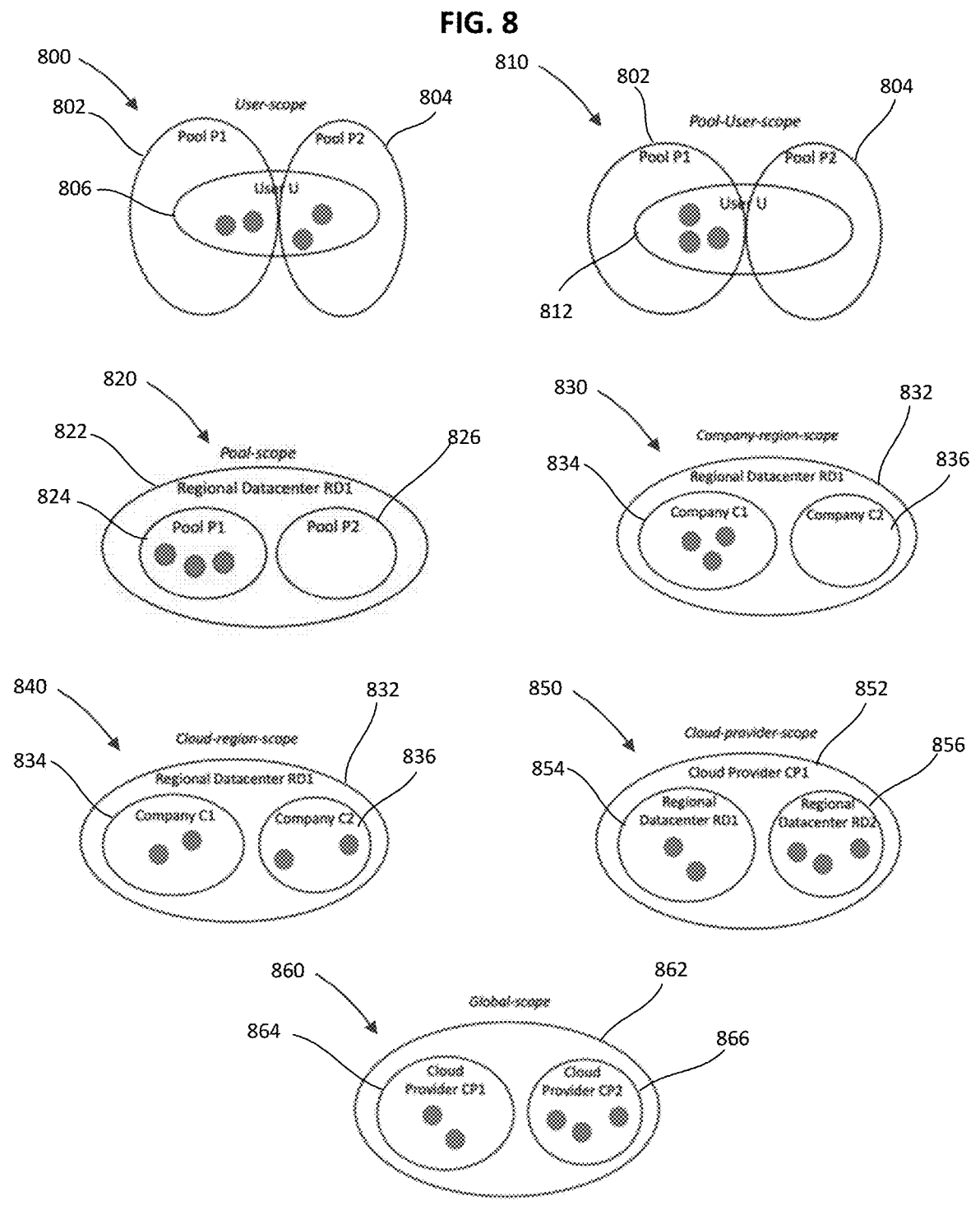

FIG. 8 shows Venn diagrams that illustrate the scope boundaries for various scopes derived from streams of problem reports (represented by small filled circles), that may or may not constitute a major incident. A first Venn diagram 800 represents a user scope for the problem reports that means the problem reports are specific to a user (e.g., problem reports having the same user attribute value), even if the users are in multiple pools (having different pool attribute values). The Venn diagram 800 includes a first pool of users 802 and a second pool of users 804. The problem reports with a common user attribute value 806 cuts across the two pools 802 and 804 and thus the problem may be specific to each user. Thus, the diagram 800 shows a user scope of the problem indicating the problem reports are specific to a user, even if the users are in multiple pools 802 and 804.

A second Venn diagram 810 represents a pool user scope for the problem reports indicating that the problem reports are specific to users in one pool. The Venn diagram 810 includes the two user pools 802 and 804. However, the problem reports with a common user attribute value 812 show that only users in the first pool 802 are affected by the problem reports.

A third Venn diagram 820 is a pool scope for the problem reports, indicating multiple users are associated with problem reports but are all in the same pool. A pool 822 represents a regional datacenter having a first pool 824 and a second pool 826. In this example, all of the users with problem reports are in the first pool 824 and thus the scope is in one pool of the regional datacenter.

A fourth Venn diagram 830 shows a company region scope of a problem report indicating that users are affected across pools but the problem reports are contained within a specific regional datacenter and the users belong to the same company. The diagram 830 shows a regional data center pool 832 with a first company pool 834 and a second company pool 836. All of the problem reports are from users in the first company pool 834.

A fifth Venn diagram 840 is a Cloud region scope of a problem report, indicating the problem reports in the spike are associated with multiple companies, but are contained within a particular regional datacenter. The diagram 840 shows the regional data center pool 832 with the first company pool 834 and the second company pool 836. In the Venn diagram 840, the problem reports are from users in the both company pools 834 and 836.

A sixth Venn diagram 850 is a Cloud provider scope indicating that the problem reports in the spike are associated with multiple companies in multiple regional datacenters, but are contained by the cloud provider service that runs those datacenters. The diagram 850 shows a cloud provider pool 862. The cloud provider pool 862 encompasses a first regional datacenter pool 854 and a second regional datacenter pool 856. In the diagram 850, the users associated with the problem reports are in both of the regional data center pools 854 and 856.

A final Venn diagram 860 shows an example global scope indicating that the problem reports are not contained by anything, indicating a failure of the desktop service system itself. The Venn diagram shows a global scope pool 862 that encompasses a first cloud provider pool 864 and a second cloud provider pool 866. The problem reports in this example come from users in both cloud provider pools 864 and 866.

One approach to scope identification is to use well-known supervised machine learning techniques, which typically involve training a system with a number of example sequences of problem reports with pre-labelled scope determinations. When new sequences of problem reports are given as input, the supervised machine learning system outputs probable scope values.

Another approach to scope identification is statistical analysis of scope indicator attribute values. This is a form of unsupervised machine learning. Problem reports are analyzed for similarity and diversity around specific scope indicator attribute values, to determine if there is a strong or weak correlation with each possible scope. The Jaccard index is one well-known example of a standard statistical technique to determine similarity and diversity of a sample set. This approach can be used to determine scope correlations based on any attribute. For explanation purposes, one particular set of scopes is depicted in the following explanation.

The combination of each scope's strong or weak correlation to the set of problem reports can be used to identify the scope. FIG. 9 shows a table 900 that is an example of the correlation of each scope to a set of problem reports to identify the scope. The example table 900 is thus a configurable heuristic for determining scope based on scope correlations, resulting in a scope classification. In this approach, each combination of scope correlations is evaluated in a hierarchical fashion, in which the first row that matches the combination of scope correlations derived from a particular problem report set determines the scope classification.

The table 900 includes columns for the strong or weak value of the user scope correlation 910, the pool-ID scope correlation 912, the cloud region scope correlation 915, the company scope correlation 916, and the cloud provider scope correlation 918. Another value for the scope correlation is the wildcard symbol "*" that signifies that any value matches. Each combination is analyzed to see if it matches the correlation values described in these columns. The first combination that matches determines the scope classification listed in a scope classification column 922. The table 900 includes a series of rows 930, 932, 934, 936, 938, 940, and 942 that show different potential problems scopes.

For example, if a set of problem reports has strong user scope correlation and weak pool-ID correlation, this matches the first row of the table 930, and therefore implies that the scope classification is user scope. However, if the set of problem reports has a weak user scope correlation and a strong pool-ID scope correlation, this matches the second row 932, implying that the scope correlation is pool scope.

If the set of problem reports has weak user, and pool-ID scope correlations and strong cloud and company scope correlations, as shown in the third row 934, the scope is therefore classified as a company region scope.

A fourth row 936 shows weak correlation with user attribute, Pool-ID attribute, Cloud region attribute and the Cloud provider, but a strong correlation with the company attribute. This indicates all users in all regions are affected and thus the scope is determined as a company scope. A fifth row 938 shows a weak correlation for the user attribute, pool-ID attribute, and company attribute, but a strong correlation for the Cloud region attribute. This indicates all users of a particular regional datacenter are affected and thus the scope is determined as a Cloud regional scope. A sixth row 940 shows weak correlation for the user attribute, pool-ID attribute, Cloud region attribute, and company attribute, but a strong correlation with the Cloud provider attribute. This indicates all users of a Cloud provider are affected and a Cloud provider scope is determined. A last row 942 shows weak correlations for all of the listed attributes indicating all users are affected and thus a global scope is determined.

Returning to FIG. 7, the scope classification is used to identify the relevant criteria 718 for the scope. In the disclosed method, the scope classification determines the problem report attributes that the diagnostic system 400 analyzes. The values of relevant criteria attributes are used to identify an associated problem candidate.

FIG. 10 shows a table 1000 that is an illustration of one example method of analyzing conditions to determine a set of possible candidate problems corresponding with a problem set. The table 1000 includes a column giving the name of each example 1010, a column 1012 of the scope, a scope-specific condition column 1014, and an indicated problem(s) column 1016. A set of rows 1020, 1022, 1024, 1026, 1028, 1030, 1032, 1034, 1036, 1038, and 1040 each correspond with a potential determined scope. Thus, the rows 1020 and 1022 constitute a user scope, the rows 1024, 1026, and 1028 constitute a pool scope, the row 1030 constitutes a company-regional scope, the rows 1032 and 1034 constitute a company scope, the row 1036 constitutes a Cloud region scope, the row 1038 constitutes a Cloud provider scope, and the row 1040 constitutes a global scope.

The rows each constitute a rule that is evaluated to determine a list of candidate indicated problems. Because the interpretation of the conditions is narrowed by scope, it is possible to employ rules that embody expert knowledge about scope-specific interpretations. When a problem set has a determined scope, the first step in the analysis is that a table such as the table 1000 is searched to find all the rows where the scope matches the scope in the example row. For example, when there is a problem set with user-scope, the rows identified as U1 (1020) and U2 (1022) are examined and the other rows are ignored.

The second step is to analyze each of the identified rows in turn. Each identified row has an expression representing a logical condition, using logic operators, such as "=", "<", ">", "in", "not in", and so forth. This is a common type of notation for conditional expressions that may be evaluated to result in a "True" or "False" value, or some statistical "fuzzy match". The conditional expressions may also use named variables for evaluation purposes whose values are determined when the system is running, and may be based on configurations or context-specific attribute values. For example, for the user-scope, there may be a variable called {cpu_threshold} indicating a configuration parameter that has a specific value specified by an administrative user, such as 80%.

Each example in the illustrated set of examples may be explained as logic rules as follows. Example U1 of the row 1020, in the context of a User-scope problem set, indicates that a specific user's desktop has an insufficient configuration of RAM (Random Access Memory). Example U2 of the row 1022, in the context of a user-scope problem set, indicates that network bandwidth for that user is lower than expected, and there may be a problem with either end of the network connection: either the client hardware, or the configured desktop virtual machine, or a problem with network infrastructure.

Example P1 in row 1024, in the context of a Pool-scope problem set, examines the average CPU readings of the specified pool. If the CPU readings show a higher CPU utilization than expected, the virtual machine specification for the pool may not be sufficiently powered to handle the application load intended for this pool. Example P2 in row 1026, in the context of a Pool-scope problem set, examines the driver type of the template associated with the specified pool. Valid drivers are specified in a configured whitelist (a list of known allowable values. If the driver type is not present in the whitelist, the indicated problem is a bad driver. Example P3 in row 1028, in the context of a Pool-scope problem set, references a computed gateway health score that is obtained by checking various other compiled metrics based on status reports from the gateways assigned to the pool. If the aggregate health score of the gateways is lower than expected, then the indicated problem is the gateways assigned to the pool. For example, if a particular gateway reports a high number of connection failures, and/or poor response times, or is handling a larger connection load than it is expected to handle, the system may report a health score of 50%, while the configured health threshold is 90%. In this case, it would satisfy the rule that indicates that the gateway may be cause of the problems in the problem set.

Example CR1 in row 1030, in the context of a Company-Region-scope problem set, references a computed average round-trip-time (a metric indicating network lag, or "latency") for the entire regional network configured for a company (for example, the company Acme Corp's virtual network in the cast-asia-1 region of the cloud service provider). If the round trip time aggregated value is higher than expected, this indicates a possible problem with the cloud region's network.

Example C1 in row 1032, in the context of a Company-scope problem set, references that a significant number of problems are associated with authorization. This indicates that there may be either authentication problems (such as with an identity service), or authorization problems (such as with an access control system) within the company's cloud subscription itself. Example C2 in row 1034, in the context of a Company-scope problem set, references that a significant number of problems are associated with a particular client version that is not found in the list of released versions. In other words, it is pre-release quality and may have been deployed as part of a testing or "Beta" program to selected customers. This can be done using an example deployment system known as "client rings", but there may be many such other examples of deployment systems. For example, when the last fully released client is version 6, but the client rings deployment system may have been configured for a particular customer to deploy version 7 that is not fully tested. If a problem set is associated with version 7, it is therefore indicated that there may be a problem with the "pre-release" or beta version of the client software.

Example CLR1 in row 1036, in the context of a Cloud-Region-scope problem set, references a computed cloud region health score that is obtained by checking various other compiled metrics based on status reports from the cloud provider. If the aggregate health score of the cloud region is lower than expected, then the indicated problem is the cloud region itself. For example, a cloud region such as us-west2 from a particular cloud provider normally has a health score of 100%. If notifications are received that some services are impacted, some heuristic about the importance of these services could result in a lowered score of 80%. If there were a preconfigured health threshold of 95%, the cloud region's health score would be considered to be below the health threshold, and the cloud region's services could the root cause of the problem.

Example CP1 in row 1038, in the context of a Cloud-Provider-scope problem set, references a computed cloud provider health score that is obtained by checking various other compiled metrics based on status reports from the cloud provider's non-regional services, or status reports from across all regions. If the aggregate health score of the Cloud provider is lower than expected, then the indicated problem is the cloud provider itself, across regions. For example, the cloud provider may normally have a health score of 100%. If notifications are received that non-regional services, and/or services across all regions are impacted and the health scores of each cloud region are taken in the aggregate, there could be a computed health score of 80%. If there were a preconfigured health threshold of 95%, the cloud provider's health score would be considered to be below the health threshold, and the cloud provider itself could the root cause of the problem.

Example G1 in the row 1040, in the context of a Global-scope problem set, references a computed global DNS (Domain Name Service) health score that is obtained by periodic checking of access using DNS services. If the health score of DNS is lower than expected, then the indicated problem is DNS, across all customers and regions, because it the DNS service is needed to resolve any network name into a valid IP address and is essential to any connectivity between networks.

It is to be understood that the above scenarios in relation to the table 1000 are merely examples of scope, conditions, and problems that may have been configured as part of the solution. As new problems are discovered, they may be labelled in a problem management system in such a way that this table could easily be expanded to handle them using this system.

The candidate indicated problems can be correlated with the change event stream to produce a list of candidate related changes. For example, a change to an authentication plugin version that precedes a problem set with indicated problems about authentication may further narrow down the blast radius.

Returning to FIG. 7, the computation of the blast radius 724 is performed based on the attribute and analysis of candidate related changes. With this information, the diagnostic system 400 in FIG. 4 can search for all users to see which users are subject to the effect. The blast radius is the number of users returned by the search. The method of implementing this search depends on the identified scope and may include root cause attributes. For example, if the scope is company scope, and the root cause is a pre-release client version, then the diagnostic system 400 can search for all users who are associated with that pre-release client version. Another example would be if the scope were pool scope, and the problem is a bad driver. The diagnostic system 400 can search for all users associated with that driver.

Once a root cause has been identified for a major-incident, mitigating actions 314 in FIG. 3 can be taken. Thus, a root cause may be configured to be mapped to an automated action. Such automated actions may include reversing a recent change, taking a problematic service or component offline, dynamically provisioning additional resources, or updating a security configuration profile. The blast radius can be used as input for rules about automatically applying mitigating actions, such as: if the blast-radius is greater than 100 users, proceed with mitigating action.

Thus, an indicated problem of user scope may result in a mitigating action of a user reset. A pool policy problem may result in a mitigating action of falling back to a known good pool configuration. A bad image problem may result in a mitigating action of scheduling a machine re-image with a known good image. A bad pool configuration problem may result in a mitigating action of falling back to a known good pool configuration. A bad gateway problem may result in a mitigating action of draining the gateway of current connections; removing the gateway from the cluster; and provisioning a replacement gateway. A client version problem may result in a mitigating action such as reversion to known good client version. Bad client or bad agent problems may result in reversion to a known good client or agents. A service problem may result in a mitigating action of flagging the service for maintenance and invoke a diagnostics routine. An agent data collector problem may result in a mitigating action of adding additional dynos to the cluster. A DNS problem may result in the mitigation actions of invoking diagnostics or restarting DNS services. A driver problem may result in the mitigation action of reverting a driver deployment configuration.

Figure 11:
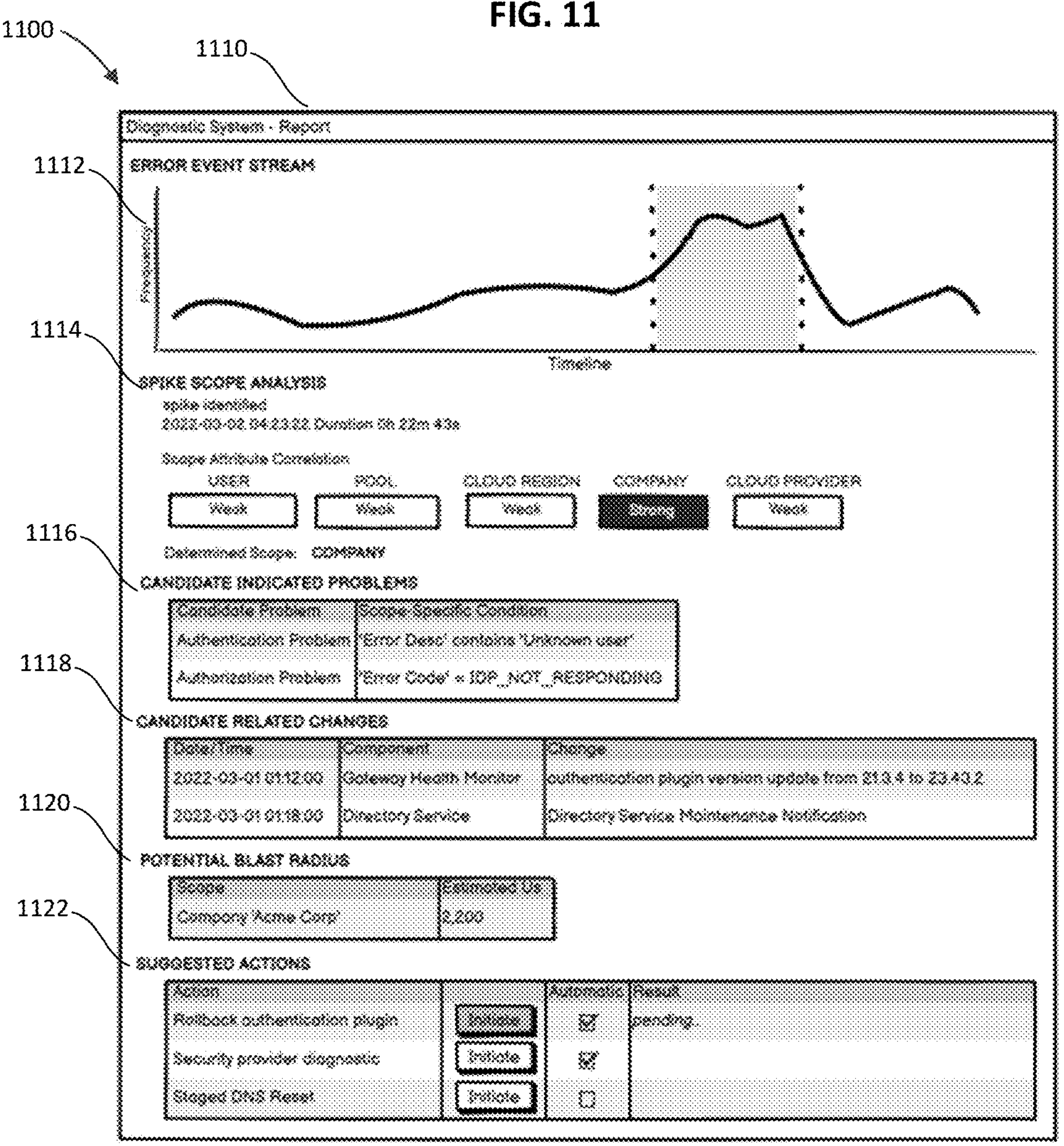
FIG. 11 illustrates an example of a user interface displaying a blast radius report produced the diagnostic service in FIG. 4.

FIG. 11 illustrates an example of a user interface 1100 displaying a blast radius report 1110 produced by the example diagnostic service in FIG. 4. The report 1110 includes an error event stream section 1112, a spike scope analysis section 1114, a candidate indicated problems section 1116, a candidate related changes section 1118, a potential blast radius section 1120, and a suggested actions section 1122.

The error event stream section 1112 displays error reports received over time, with an example of a spike identified through statistical analysis. In this example, a graph is shown with the frequencies of error events plotted against time. An error event is highlighted on the timeline of the graph. The spike scope analysis section 1114 displays information about the spike, including the time start and duration of the spike as well as the scope attribute correlation indicators explained above in reference to FIG. 9. The spike information creates the context of the remainder of the report. The spike attribute correlation indicators display whether the associated scope-specific attributes have a weak or strong correlation with the spike. In the example in FIG. 11, analysis of the scope specific attributes finds a strong correlation only with the company attribute, so the scope is determined to be company scope, as indicated by the determined scope indicator.

The candidate indicated problems section 1116 includes an example table listing the candidate related problems. In this example, based on the determined scope, candidate problems are identified based on evaluation of scope-specific conditions. In this example, there are two distinct candidate related problems in the table that are based on conditions evaluating to 'true'. One example of a condition that evaluates as true is that a significant proportion of the errors include an error description containing the phrase "Unknown user"; this creates the candidate related problem of an "Authentication Problem." Another example condition that evaluates as true is that a significant proportion of the errors include an error code with the value "IDP_NOT_RESPONDING"; this creates the candidate related problem of "Authorization Problem."

The candidate related changes section 1118 includes a table of candidate related changes. In this example, based on information about the candidate related problems in the candidate indicated problems section 1116, including the time range of the problems, two changes from the stream of change events are identified as possibly related to the candidate related problems. In one example, a change event regarding the gateway health monitor component reports that there was an authentication plugin, responsible for authenticating users, that experienced a version upgrade preceding the reported authentication problems, and therefore may be related as a cause of authentication problems. In another example, a change event regarding the directory service, that provides authorization information about users, issued a maintenance notification, and therefore could be related as a cause of authorization problems.

Based on the candidate indicated problems and candidate related changes, the potential blast radius section 1120 displays the scope of the company "Acme", with 2,200 users potentially affected. This computation can be made more accurate by examining the dependencies of the various attributes of the identified candidate indicated problems and candidate related changes. For example, if the gateway problem only affects a subset of users, and it is known that this is the only candidate indicated problem, then the scope of estimated users of the blast radius is constrained by the users of the particular gateways involved.

The suggested actions section 1122 shows suggested actions based on the candidate indicated problems, candidate related changes, and potential blast radius. Each of the three actions in this example includes a button to initiate the action, a toggle to trigger the action automatically in future, and a result showing the effect of initiating the action and its eventual outcome. The first suggested action in this example is to roll back the change to the authentication plugin. The second suggested action in this example is to run diagnostic routines on the security provider to find additional problems if any. The third suggested action in this example is to perform a staged reset of the DNS (Domain Name System) services to restore access to the authorization system. Of course any number of actions and corresponding initiation buttons may be provided.

Figure 12:
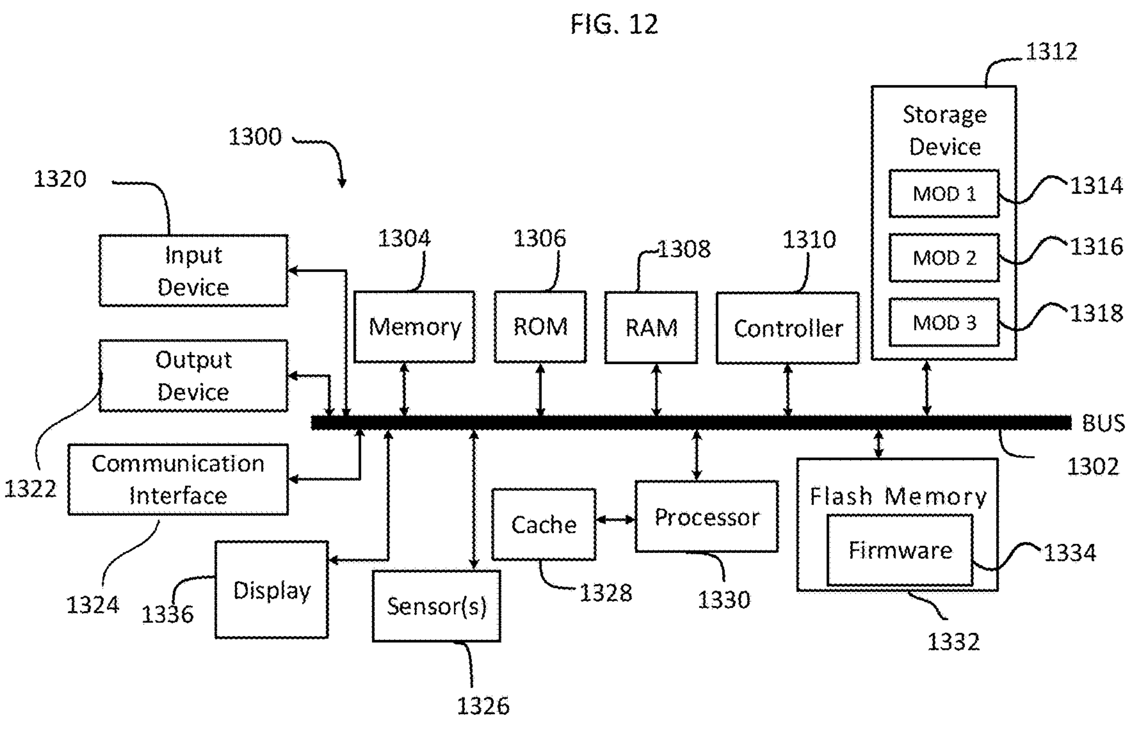
FIGS. 12 and 13 illustrate exemplary systems in accordance with various examples of the present disclosure.
Figure 13:
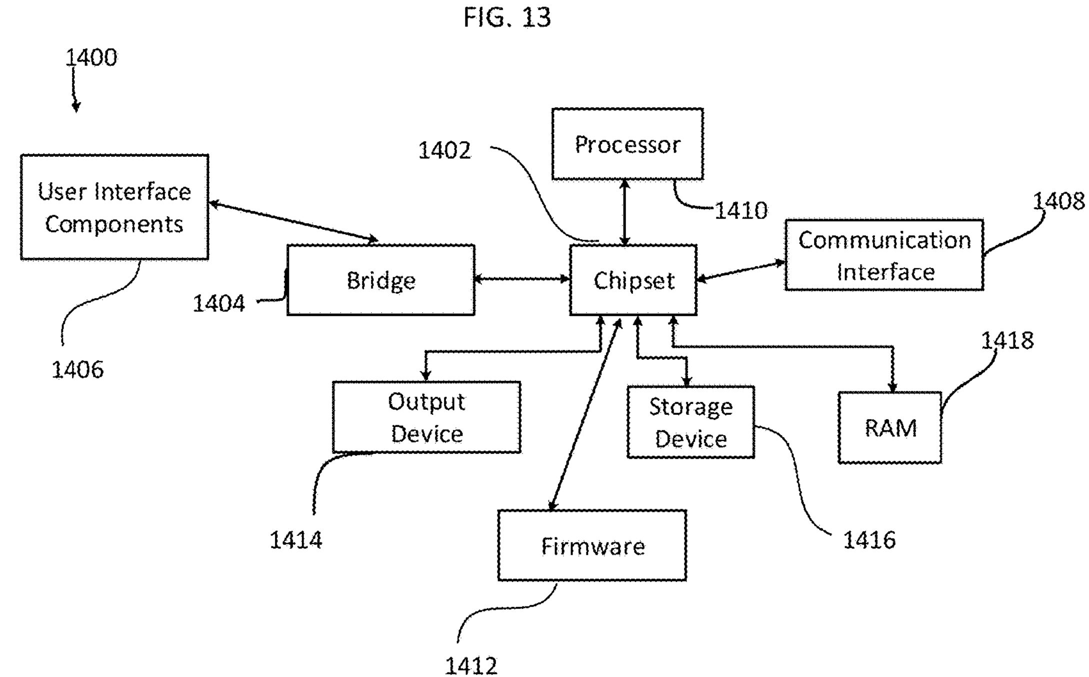

FIGS. 12-13 illustrate an example computing system 1300, in which the components of the computing system are in electrical communication with each other using a bus 1302. The system 1300 includes a processing unit (CPU or processor) 1330 and a system bus 1302 that couple various system components, including the system memory 1304 (e.g., read only memory (ROM) 1306 and random access memory (RAM) 1308), to the processor 1330. The system 1300 can include a cache of high-speed memory connected directly with, in close proximity to, or integrated as part of the processor 1330. The system 1300 can copy data from the memory 1304 and/or the storage device 1312 to the cache 1328 for quick access by the processor 1330. In this way, the cache can provide a performance boost for processor 1330 while waiting for data. These and other modules can control or be configured to control the processor 1330 to perform various actions. Other system memory 1304 may be available for use as well. The memory 1304 can include multiple different types of memory with different performance characteristics. The processor 1330 can include any general purpose processor and a hardware module or software module, such as module 1 1314, module 2 1316, and module 3 1318 embedded in storage device 1312. The hardware module or software module is configured to control the processor 1330, as well as a special-purpose processor where software instructions are incorporated into the actual processor design. The processor 1330 may essentially be a completely self-contained computing system that contains multiple cores or processors, a bus, memory controller, cache, etc. A multi-core processor may be symmetric or asymmetric.

To enable user interaction with the computing device 1300, an input device 1320 is provided as an input mechanism. The input device 1320 can comprise a microphone for speech, a touch-sensitive screen for gesture or graphical input, keyboard, mouse, motion input, and so forth. In some instances, multimodal systems can enable a user to provide multiple types of input to communicate with the system 1300. In this example, an output device 1322 is also provided. The communications interface 1324 can govern and manage the user input and system output.

Storage device 1312 can be a non-volatile memory to store data that is accessible by a computer. The storage device 1312 can be magnetic cassettes, flash memory cards, solid state memory devices, digital versatile disks, cartridges, random access memories (RAMs) 1308, read only memory (ROM) 1306, and hybrids thereof.

The controller 1310 can be a specialized microcontroller or processor on the system 1300, such as a BMC (baseboard management controller). In some cases, the controller 1310 can be part of an Intelligent Platform Management Interface (IPMI). Moreover, in some cases, the controller 1310 can be embedded on a motherboard or main circuit board of the system 1300. The controller 1310 can manage the interface between system management software and platform hardware. The controller 1310 can also communicate with various system devices and components (internal and/or external), such as controllers or peripheral components, as further described below.

The controller 1310 can generate specific responses to notifications, alerts, and/or events, and communicate with remote devices or components (e.g., electronic mail message, network message, etc.) to generate an instruction or command for automatic hardware recovery procedures, etc. An administrator can also remotely communicate with the controller 1310 to initiate or conduct specific hardware recovery procedures or operations, as further described below.

The controller 1310 can also include a system event log controller and/or storage for managing and maintaining events, alerts, and notifications received by the controller 1310. For example, the controller 1310 or a system event log controller can receive alerts or notifications from one or more devices and components, and maintain the alerts or notifications in a system event log storage component.

Flash memory 1332 can be an electronic non-volatile computer storage medium or chip that can be used by the system 1300 for storage and/or data transfer. The flash memory 1332 can be electrically erased and/or reprogrammed. Flash memory 1332 can include EPROM (erasable programmable read-only memory), EEPROM (electrically erasable programmable read-only memory), ROM, NVRAM, or CMOS (complementary metal-oxide semiconductor), for example. The flash memory 1332 can store the firmware 1334 executed by the system 1300 when the system 1300 is first powered on, along with a set of configurations specified for the firmware 1334. The flash memory 1332 can also store configurations used by the firmware 1334.

The firmware 1334 can include a Basic Input/Output System or equivalents, such as an EFI (Extensible Firmware Interface) or UEFI (Unified Extensible Firmware Interface). The firmware 1334 can be loaded and executed as a sequence program each time the system 1300 is started. The firmware 1334 can recognize, initialize, and test hardware present in the system 1300 based on the set of configurations. The firmware 1334 can perform a self-test, such as a POST (Power-On-Self-Test), on the system 1300. This self-test can test the functionality of various hardware components such as hard disk drives, optical reading devices, cooling devices, memory modules, expansion cards, and the like. The firmware 1334 can address and allocate an area in the memory 1304, ROM 1306, RAM 1308, and/or storage device 1312, to store an operating system (OS). The firmware 1334 can load a boot loader and/or OS, and give control of the system 1300 to the OS.

The firmware 1334 of the system 1300 can include a firmware configuration that defines how the firmware 1334 controls various hardware components in the system 1300. The firmware configuration can determine the order in which the various hardware components in the system 1300 are started. The firmware 1334 can provide an interface, such as an UEFI, that allows a variety of different parameters to be set, which can be different from parameters in a firmware default configuration. For example, a user (e.g., an administrator) can use the firmware 1334 to specify clock and bus speeds, define what peripherals are attached to the system 1300, set monitoring of health (e.g., fan speeds and CPU temperature limits), and/or provide a variety of other parameters that affect overall performance and power usage of the system 1300. While firmware 1334 is illustrated as being stored in the flash memory 1332, one of ordinary skill in the art will readily recognize that the firmware 1334 can be stored in other memory components, such as memory 1304 or ROM 1306.

System 1300 can include one or more sensors 1326. The one or more sensors 1326 can include, for example, one or more temperature sensors, thermal sensors, oxygen sensors, chemical sensors, noise sensors, heat sensors, current sensors, voltage detectors, air flow sensors, flow sensors, infrared thermometers, heat flux sensors, thermometers, pyrometers, etc. The one or more sensors 1326 can communicate with the processor, cache 1328, flash memory 1332, communications interface 1324, memory 1304, ROM 1306, RAM 1308, controller 1310, and storage device 1312, via the bus 1302, for example. The one or more sensors 1326 can also communicate with other components in the system via one or more different means, such as inter-integrated circuit (I2C), general purpose output (GPO), and the like. Different types of sensors (e.g., sensors 1326) on the system 1300 can also report to the controller 1310 on parameters, such as cooling fan speeds, power status, operating system (OS) status, hardware status, and so forth. A display 1336 may be used by the system 1300 to provide graphics related to the applications that are executed by the controller 1310.

FIG. 13 illustrates an example computer system 1400 having a chipset architecture that can be used in executing the described method(s) or operations, and generating and displaying a graphical user interface (GUI). Computer system 1400 can include computer hardware, software, and firmware that can be used to implement the disclosed technology. System 1400 can include a processor 1410, representative of a variety of physically and/or logically distinct resources capable of executing software, firmware, and hardware configured to perform identified computations. Processor 1410 can communicate with a chipset 1402 that can control input to and output from processor 1410. In this example, chipset 1402 outputs information to output device 1414, such as a display, and can read and write information to storage device 1416. The storage device 1416 can include magnetic media, and solid state media, for example. Chipset 1402 can also read data from and write data to RAM 1418. A bridge 1404 for interfacing with a variety of user interface components 1406, can be provided for interfacing with chipset 1402. User interface components 1406 can include a keyboard, a microphone, touch detection, and processing circuitry, and a pointing device, such as a mouse.

Chipset 1402 can also interface with one or more communication interfaces 1408 that can have different physical interfaces. Such communication interfaces can include interfaces for wired and wireless local area networks, for broadband wireless networks, and for personal area networks. Further, the machine can receive inputs from a user via user interface components 1406, and execute appropriate functions, such as browsing functions by interpreting these inputs using processor 1410.

Moreover, chipset 1402 can also communicate with firmware 1412, which can be executed by the computer system 1400 when powering on. The firmware 1412 can recognize, initialize, and test hardware present in the computer system 1400 based on a set of firmware configurations. The firmware 1412 can perform a self-test, such as a POST, on the system 1400. The self-test can test the functionality of the various hardware components 1402-1418. The firmware 1412 can address and allocate an area in the memory 1418 to store an OS. The firmware 1412 can load a boot loader and/or OS, and give control of the system 1400 to the OS. In some cases, the firmware 1412 can communicate with the hardware components 1402-1410 and 1414-1418. Here, the firmware 1412 can communicate with the hardware components 1402-1410 and 1414-1418 through the chipset 1402, and/or through one or more other components. In some cases, the firmware 1412 can communicate directly with the hardware components 1402-1410 and 1414-1418.

It can be appreciated that example systems 1300 (in FIG. 12) and 1400 can have more than one processor (e.g., 1330, 1410), or be part of a group or cluster of computing devices networked together to provide greater processing capability.

As used in this application, the terms "component," "module," "system," or the like, generally refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller, as well as the controller, can be a component. One or more components may reside within a process and/or thread of execution, and a component may be localized on one computer and/or distributed between two or more computers. Further, a "device" can come in the form of specially designed hardware, generalized hardware made specialized by the execution of software thereon that enables the hardware to perform specific function, software stored on a computer-readable medium, or a combination thereof.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

While various embodiments of the present invention have been described above, it should be understood that they have been presented by way of example only, and not limitation. Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

What is claimed is:

1. A diagnostic system for determining a blast radius from a major incident in a virtual remote desktop system providing access to virtual desktops by client devices, the virtual remote desktop system having network interconnected service components including servers executing a virtual machine to execute the virtual desktops and the client devices, individual cloud desktops or application servers, and a network gateway allowing access to a network, the diagnostic system comprising:

an event collection module coupled to the service components of the desktop system, the event collection module collecting events data via the network, the events data generated electronically from the service components including the servers and the client devices;

an aggregation module coupled to the event collection module, the aggregation module executed by a processor, the aggregation module merging the collected events data in a time-ordered stream, providing context to the events data in the time-ordered stream through relationships between the collected events data, and generating a correlated event stream; and a diagnosis module executed by a processor configured to:

determine a stream of problem reports from the correlated event stream;

determine a spike in the stream of problem reports;

determine the attributes of the problem reports in the spike to define the major incident;

determine a scope of the major incident and a corresponding attribute to determine a blast radius of service components associated with the major incident in the virtual remote desktop system; and send a command over the network to one or more of the service components in the blast radius to execute a mitigating action for the one or more of those service components, wherein the mitigating action includes at least one of upgrading one of the cloud desktops or applications servers, or changing the capability of the network gateway.

2. The system of claim 1, wherein the mitigating action is an upgrade to a CPU or memory capacity of the individual cloud desktops or application servers.

3. The system of claim 1, wherein the network gateway includes a cluster of remote display protocol gateways, wherein the mitigation action includes an expansion of the size of a cluster of the remote display protocol gateways, an upgrade to a CPU of an individual remote display protocol gateway, or an upgrade to memory capacity of an individual remote display protocol gateways.

4. The system of claim 1, wherein the mitigating action includes a reconfiguration to redirect end users to a virtualization infrastructure of service components outside of the blast radius.

5. The system of claim 1, wherein the mitigating action includes an update to network configuration, including the configuration of domain name services to restore access to authorization.

6. The system of claim 1, wherein the mitigating action includes an update to configurations of a cloud service provider configurations, the update including an inventory of resources available within the cloud provider service subscription.

7. The system of claim 1, wherein the mitigating action includes an update to authentication service configurations, authorization service configuration, or security provider service configurations.

8. The system of claim 1, wherein the diagnosis module recommends another mitigating action based on the determined corresponding attribute.

9. The system of claim 1, wherein the diagnosis module generates an interface on the display showing the service components affected by the blast radius.

10. The system of claim 1, wherein the service components include at least one of installed client software, networks used by endpoint client devices, cloud APIs for managing virtual desktop infrastructure, regional resources, gateway hosts, virtual desktop hosts, agent services, virtual application servers, virtual desktop operating systems, computing services, storage services, and network services.

11. The system of claim 1, further comprising:

a desktop service control plane coupled to the service components and other event sources, wherein the desktop service control plane includes a monitoring service to report faults from the components; and an event data repository storing the events, the event collection module being coupled to the event data repository and storing collected events to the event data repository.

12. A method for mitigating a blast radius of a major incident in a virtual remote desktop system providing virtual desktops to client devices, the virtual remote desktop system having network interconnected service components including servers executing a virtual machine to execute the virtual desktops and the client devices, individual cloud desktops or application servers, and a network gateway allowing access to a network, the method comprising:

collecting events data of service components via the network, the events data generated electronically from all service components traced to a fault including the servers and the client devices;

merging the collected events data in a time-ordered event stream via a processor;

correlating the collected events data in the time-ordered event stream to show relationships across events data to create a correlated event stream;

determining a stream of problem reports from the correlated event stream; determine a spike in the stream of problem reports via the processor;

determining the attributes of the problem reports in the spike to define the major incident via the processor;

determining a scope of the major incident and a corresponding attribute to determine the blast radius associated with the major incident in the virtual remote desktop system via the processor; and sending a command to at least some of service components in the blast radius to perform a mitigating action, wherein the mitigating action includes at least one of upgrading one of the cloud desktops or application servers, or changing the capability of the network gateway.

13. The method of claim 12, wherein the mitigating action is an upgrade to a CPU or memory capacity of the individual cloud desktops or application servers.

14. The method of claim 12, wherein the network gateway includes a cluster of remote display protocol gateways, wherein the mitigation action includes an expansion of the size of a cluster of the remote display protocol gateways, an upgrade to a CPU of an individual remote display protocol gateway, or an upgrade to memory capacity of an individual remote display protocol gateways.

15. The method of claim 12, wherein the mitigating action includes a reconfiguration to redirect end users to a virtualization infrastructure of service components outside of the blast radius.

16. The method of claim 12, wherein the mitigating action includes an update to network configuration, including the configuration of domain name services to restore access to authorization.

17. The method of claim 12, wherein the mitigating action includes an update to configurations of a cloud service provider configurations, the update including an inventory of resources available within the cloud provider service subscription.

18. The method of claim 12, wherein the mitigating operation includes an update to authentication service configurations, authorization service configuration, or security provider service configurations.

19. The method of claim 12, further comprising generating an interface on the display showing the service components affected by the blast radius.

20. A diagnostic system for determining a blast radius from a major incident in a virtual remote desktop system providing access to virtual desktops by client devices, the virtual remote desktop system having network interconnected service components including servers executing a virtual machine to execute the virtual desktops and the client devices, the diagnostic system comprising:

an event collection module coupled to the service components of the desktop system, the event collection module collecting events data via the network, the events data generated electronically from the service components including the servers and the client devices;

an aggregation module coupled to the event collection module, the aggregation module executed by a processor, the aggregation module merging the collected events data in a time-ordered stream, providing context to the events data in the time-ordered stream through relationships between the collected events data, and generating a correlated event stream; and an analysis module executed by a processor configured to:

determine a stream of problem reports from the correlated event stream;

determine a spike in the stream of problem reports;

determine the attributes of the problem reports in the spike to define the major incident;

determine a scope of the major incident and a corresponding attribute to determine a blast radius composed of all service components associated with the major incident; and send a command over the network to one or more of the service components in the blast radius to execute a mitigating action, wherein the mitigating action includes at least one of reconfiguration to redirect end users to a virtualization infrastructure of service components outside of the blast radius; updating a network configuration; updating configurations of a cloud service provider configurations, updating an authentication service configuration, updating an authorization service configuration, or updating a security provider service configuration.

* * * * *